United States Patent [19]

Nakagawa

[11] Patent Number: 5,208,678
[45] Date of Patent: May 4, 1993

[54] AUDIO AND VIDEO DATA SYNCHRONIZATION APPARATUS FOR RECORDING AND REPRODUCING SYSTEM

[75] Inventor: Yukio Nakagawa, Osaka, Japan

[73] Assignee: Matsushita Electric Industrial Co., Ltd., Osaka, Japan

[21] Appl. No.: 756,018

[22] Filed: Sep. 6, 1991

[30] Foreign Application Priority Data

Sep. 18, 1990 [JP] Japan .................................. 2-249431

[51] Int. Cl.⁵ ............................................. H04N 5/91
[52] U.S. Cl. .................................... 358/341; 358/343; 360/19.1
[58] Field of Search ............... 358/341, 343, 311, 319, 358/320, 326, 335, 337; 360/19.1, 36.1

[56] References Cited

U.S. PATENT DOCUMENTS

| | | | |
|---|---|---|---|
| 4,672,468 | 6/1987 | Okada et al. | 358/310 |
| 4,792,866 | 12/1988 | Hirobe et al. | 360/10.1 |
| 4,961,116 | 10/1990 | Kanamara et al. | 358/343 |
| 5,027,222 | 6/1991 | Shinbo et al. | 358/330 |
| 5,087,980 | 2/1992 | Staffer | 358/335 |

FOREIGN PATENT DOCUMENTS

62-18586 1/1987 Japan .
62-77793 4/1987 Japan .

OTHER PUBLICATIONS

Audio Engineering Society, Inc., "AES Recommended Practice for Digital Audio Engineering—Serial Transmission Format for Linearly Represented Digital Audio Data", (ANSI S4.40-1985), vol. 33, No. 12, Dec. 1985, pp. 976-984.

Edwin Engberg et al;., "The Composite digital Format and Its Applications", SMPTE Television Conference San Francisco, Feb. 1987, pp. 84-107.

Rec. 601-1, "Encoding Parameters of Digital Television For Studios", 1982-1986, pp. 319-328.

Rec. 657, "Digital Television Tape Recording", Document 11/1055-E, Jan. 7, 1986.

Primary Examiner—Tommy P. Chin
Assistant Examiner—Robert Chevalier
Attorney, Agent, or Firm—Lowe, Price, LeBlanc & Becker

[57] ABSTRACT

A frequency converting circuit serves to generate a clock signal of a video sampling frequency from one of a clock signal or a sync signal outputted from a digital audio interface. An oscillator serves to generate a clock signal of the video sampling frequency. A video reference generating circuit serves to generate a video timing signal, an audio timing signal, and black burst data from one of the clock signals generated by the frequency converting circuit and the oscillator, and from an output reference video signal. In cases where the recording audio data is recorded or edited, a first switching device replaces the recording video data by the black burst data, and feeds the black burst data to the video recording processing circuit. In these cases, a second switching device replaces the video-sampling-frequency clock signal from the oscillator by the video-sampling-frequency clock signal from the frequency converting circuit, and feeds the video-sampling-frequency clock signal from the frequency converting circuit to the video reference generating circuit. In addition, a third switching device suspends detection of an output reference fed to the video reference generating circuit, and inhibits a timing reset of the video reference generating circuit.

8 Claims, 14 Drawing Sheets

AUDIO AND VIDEO DATA SYNCHRONIZATION APPARATUS FOR RECORDING AND REPRODUCING SYSTEM

BACKGROUND OF THE INVENTION

This invention relates to a recording and reproducing apparatus, such as a digital VTR (video tape recorder), which can record, reproduce, and edit video data and audio data.

In the field of digital audio, there are standards for digital audio interfaces connecting digital audio equipments as disclosed in AES-1985 (ANSI S4.40-1985). Some of industrial-use and broadcast-use VTRs are of the digital type executing digital recording of a video signal. Known apparatus can simultaneously record, reproduce, and edit digital video data and digital audio data, the digital video data being derived from a video signal, the digital audio data being outputted from a digital audio interface. As will be explained later, such prior art recording and reproducing apparatus have some problems.

SUMMARY OF THE INVENTION

It is an object of this invention to provide an improved video and audio data recording and reproducing apparatus.

According to a first aspect of this invention, in a system wherein a video recording processing circuit and an audio recording processing circuit process digital recording video data and digital recording audio data; output data from the video recording processing circuit and the audio recording processing circuit is recorder into a recording medium by using a sync signal of the digital recording video data as a reference; a video reproducing processing circuit and an audio reproducing processing circuit process data reproduced from the recording medium; and reproduced video data and reproduced audio data are outputted in synchronism with an output reference video signal, a video and audio data recording and reproducing apparatus usable in combination with a digital audio interface, comprises a frequency converting circuit for generating a clock signal of a video sampling frequency from one of a clock signal or a sync signal outputted from the digital audio interface; an oscillator for generating a clock signal of the video sampling frequency; a video reference generating circuit for generating a video timing signal, an audio timing signal, and black burst data from one of the clock signals generated by the frequency converting circuit and the oscillator, and from the output reference video signal; first switching means for, in cases where the recording audio data is recorded or edited, replacing the recording video data by the black burst data and feeding the black burst data to the video recording processing circuit; second switching means for, in cases where the recording audio data is recorded or edited, replacing the video-sampling-frequency clock signal from the oscillator by the video-sampling-frequency clock signal from the frequency converting circuit and feeding the video-sampling-frequency clock signal from the frequency converting circuit to the video reference generating circuit; and third switching means for, in cases where the recording audio data is recorded or edited, suspending detection of an output reference fed to the video reference generating circuit, and inhibiting a timing reset of the video reference generating circuit.

A second aspect of this invention provides a video and audio data recording apparatus comprising a video recording processing circuit for processing first video recording data into second video recording data, and generating a timing control signal on the basis of the first video recording data; an audio recording processing circuit for processing first audio recording data into second audio recording data; means for recording the second video recording data and the second audio recording data into a recording medium; and serve-control means for controlling the recording means in response to the timing signal; the improvement comprising means for feeding output data from a digital audio interface to the audio recording processing circuit as the first audio recording data; means for generating a reference clock signal on the basis of a fixed-frequency timing component of the output data from the digital audio interface, the reference clock signal having a fixed frequency relation with the fixed-frequency timing component of the output data from the digital audio interface; means for generating reference data on the basis of the reference clock signal, the reference data corresponding to a black burst signal; and means for feeding the reference data to the video recording processing circuit as the first video recording data.

A third aspect of this invention provides a video and audio data recording apparatus usable in combination with a digital audio interface, comprising means for recording video data and audio data into a recording medium; means for generating a first timing signal on the basis of the video data; means for extracting audio data from an output signal of the digital audio interface, and feeding the extracted audio data to the recording means; means for generating a second timing signal on the basis of the output signal of the digital audio interface in the absence of the video data; and servo-control means for controlling the recording means in response to the first timing signal in the presence of the video data and in response to the second timing signal in the absence of the video data.

DESCRIPTION OF THE PRIOR ART

Figure 1:
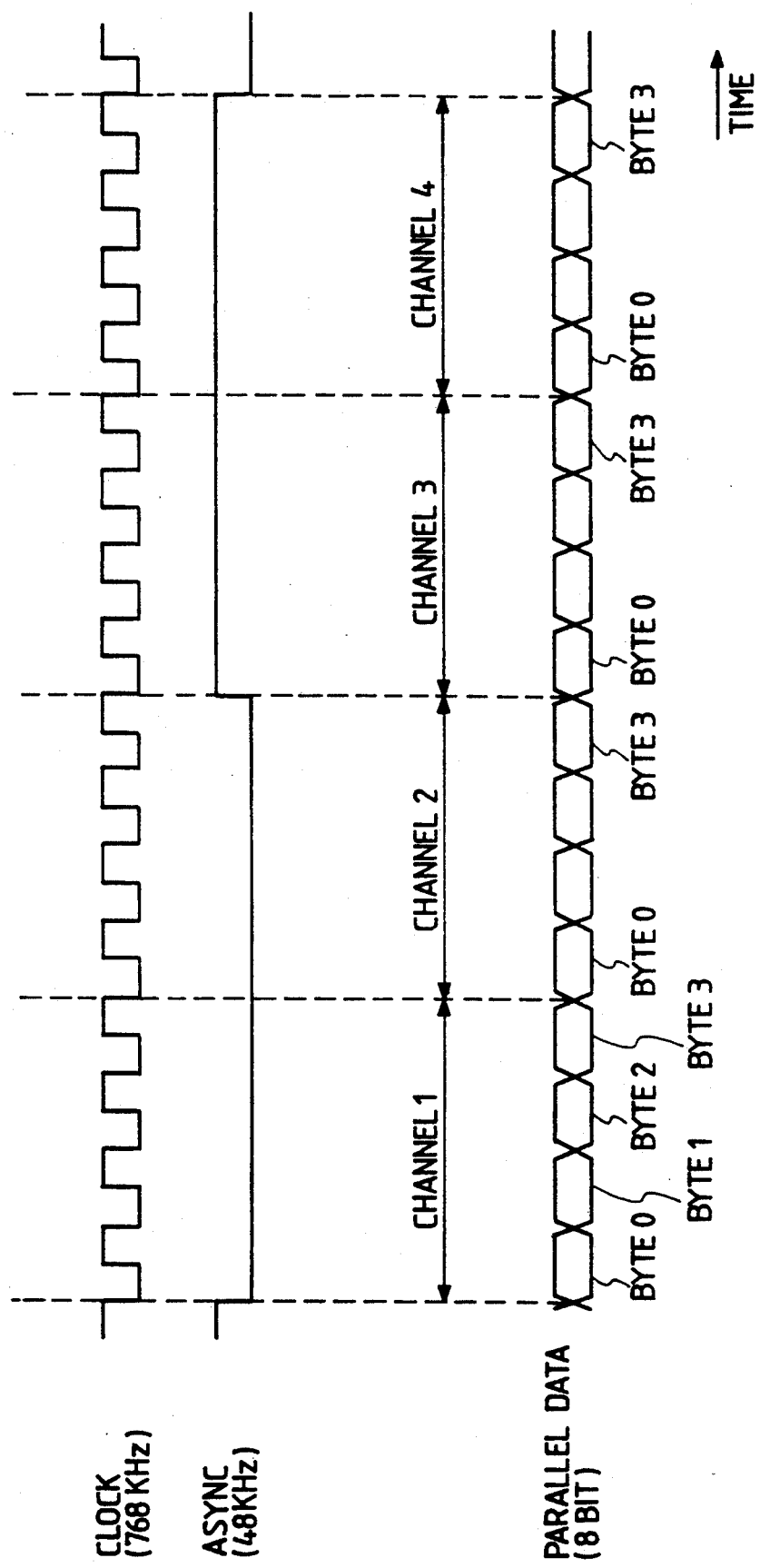
FIG. 1 is a timing diagram showing the waveforms of components of an output signal from a digital audio interface.

In general digital audio interfaces, a signal of one system can transmit data of two channels, and data corresponding to a sample is transmitted as 32-bit serial data. In general digital VTRs, audio data results from a 16-bit linear quantization using a sampling frequency fas of 48 KHz, and parallel data corresponding to a sample is converted into serial data. The serial data corresponding to a sample, a preamble, expansion data bits, and error detection or error correction bits are combined into one sub frame of serial data. In the digital audio interfaces, since data of two channels are multiplexed in a time division manner before being transmitted, the bit transmission rate corresponds to 64 bits per sample of audio data and the frequency of a clock signal for data transmission is equal to 64 times the frequency fas. A clock signal having a frequency "64fas" is used in the conversion of output serial data from a digital audio interface into 16-bit audio data. The clock signal having a frequency "64fas" is reproduced from a preamble of one sub frame by a clock reproducing circuit using a PLL (a phase-locked loop). An audio-data sampling clock signal having a frequency fas can be easily obtained by detecting the phase of the serial data, and by frequency-dividing the clock signal of a frequency "64fas" in synchronism with the detected phase.

During the transfer of information between tapes in digital VTRs, a reproduced video signal outputted from a first VTR determines the speed of recording of the information into the tape of a second VTR, and an audio signal is outputted from the first VTR at a phase fixed relative to the phase of the output video signal.

In the NTSC and PALM television systems, the relation of the sampling frequency fas for audio information with the horizontal frequency fh of a video signal is expressed by the following equation.

$$fas = (1144/375)fh \quad (1)$$

In the PAL television systems, the relation of the sampling frequency fas for audio information with the horizontal frequency fh of a video signal is expressed by the following equation.

$$fas = (384/125)fh \quad (2)$$

During the dubbing of audio and video information between tapes of digital VTRs, recorded audio information is automatically synchronized with recorded video information. In the case where audio information outputted from a digital audio equipment is recorded by a digital VTR, it is necessary to provide synchronization between the reproducing operation of the digital audio equipment and the recording operation of the digital VTR.

A first prior art way of such synchronization has a step of feeding a reference video signal to both a digital audio equipment and a digital VTR. In the digital audio equipment, the speed of reproduction of audio information is controlled in response to the horizontal sync components of the reference video signal so that the previously-mentioned frequency relation (1) or (2) will be satisfied. In the digital VTR, the timing of recording of the audio information is controlled so as to correspond to the timing of recording of the reference video signal.

A second prior art way of synchronization is realized by a synchronizing interface between a digital audio equipment and a digital VTR. The digital audio equipment is designed so as to have the additional function of generating a sync signal such as a composite sync signal which is synchronous with a sampling clock signal for reproduced data. The synchronizing interface transmits the sync signal from the digital audio equipment to the digital VTR. In the digital VTR, the timing of recording of the audio information is controlled in response to the sync signal.

According to a third prior art way of synchronization, a digital VTR is designed so as to have the additional function of generating a sampling clock signal synchronous with an information recording timing. The sampling clock signal is transmitted to a digital audio equipment. In the digital audio equipment, the timing of reproduction of audio information is controlled in response to the sampling clock signal.

Most of home-use digital audio equipments such as home-use digital audio tape recorders can not accept a reference video signal and a composite sync signal. Thus, the reproducing operation of these home-use digital audio equipments can not be synchronized with the recording operation of a digital VTR. In the absence of synchronization between the reproducing operation of a digital audio equipment and the recording operation of a digital VTR, the quality of recorded and reproduced audio information tends to be deteriorated.

Such a problem can be resolved by providing a digital audio equipment with a function of obtaining synchronization with a video signal. In general, providing a digital audio equipment with a synchronizing function necessitates a large additional circuit. In addition, it is necessary to provide a source for generating a reference video signal.

A fourth prior art way of synchronization has the step of generating a horizontal-frequency signal of reference video information on the basis of an audio sampling clock signal according to the previously-mentioned frequency relation (1) or (2). The horizontal-frequency signal is used as a reference for the recording operation of a digital VTR.

In 4:2:2 component-type digital VTRs (D-1 format) according to standards of CCIR REC. 657, the sampling frequency fs (13.5 MHz) related to component video data has the following relation with the horizontal frequency fh of NTSC and PALM television signals.

$$fs = 858 fh \quad (3)$$

In addition, the sampling frequency fs related to component video data has the following relation with the horizontal frequency fh of PAL television signals.

$$fs = 864 fh \quad (4)$$

A sampling clock signal used in the conversion of an analog video signal into digital video data is generated from a suitable-frequency signal, such as a composite sync signal, which has a frequency equal to a horizontal frequency fh. Thus, it is easy to synchronize the reproducing operation of a digital audio equipment and the recording operation of a digital VTR by using a video sync signal such as a composite sync signal in the interface between the digital audio equipment and the digital VTR.

Edwin Engberg et al published "The Composite Digital Format and its Applications", SMPTE Television Conference, San Francisco, February 1987. This publication relates to composite-type digital VTRs (D-2 format) in which a television signal is sampled at a frequency equal to a multiple of a color subcarrier frequency, and a composite video signal is subjected to a digital recording process. It is generally difficult to synchronize the recording operation of such a digital VTR with audio data.

For example, in a digital VTR of the D-2 format, a video sampling frequency fs is equal to four times a color subcarrier frequency fsc. The video sampling frequency fs has a simple ralation with the horizontal frequency fh of an NTSC television signal since there is the following simple ratio between the horizontal frequency fh and the color subcarrier frequency fsc of the NTSC television signal.

$$fsc = (455/2) fh \quad (5)$$

On the other hand, the video sampling frequency fs has a complicated relation with the horizontal frequency fh of a PAL television signal since there is the following complicated ratio between the horizontal frequency fh and the color subcarrier frequency fsc of the PAL television signal.

$$fsc = (1135/4 + 1/625) fh \quad (6)$$

In this case, it is generally difficult to generate a sampling clock signal from a horizontal-frequency signal.

In digital VTRs, the positions of recording of digital data on a tape, the positions of the boundaries between audio data and video data on the tape, and the timing of recording of the digital data are determined by a video reference synchronous with a video sampling clock signal. Thus, composite-type digital VTRs require the generation of a signal of a video sampling frequency fsc which is related to an audio sampling frequency fas by the previously-mentioned equations (1), (2), (5), and (6). Accordingly, a large circuit tends to be necessary for synchronizing the recording operation of the digital VTR with the audio sampling clock signal.

DESCRIPTION OF THE FIRST PREFERRED EMBODIMENT

Figure 11:
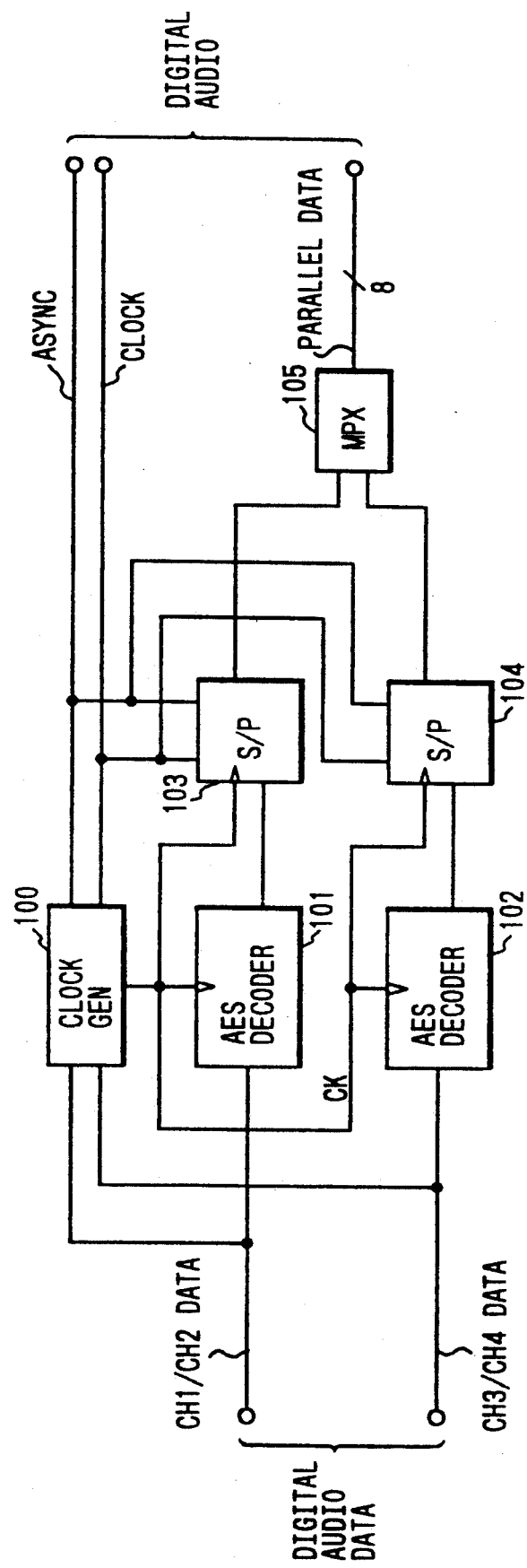
FIG. 11 is a block diagram of a decoder section of a digital audio interface in a digital VTR.

FIG. 11 shows a decoder section of a digital audio interface in a digital VTR. FIG. 1 shows the waveform of signals outputted from the decoder section of FIG. 11.

As shown in FIG. 11, the decoder section includes a clock reproducing circuit 100, serial decoders 101 and 102, serial-to-parallel (S/P) converters 103 and 104, and a multiplexer 105.

Since a normal digital VTR can record audio data of four channels, the decoder section of FIG. 11 is designed so as to handle first serial data CH1/CH2 DATA and second serial data CH3/CH4 DATA which compose four channels. The serial decoders 101 and 102 receive the first serial data CH1/CH2 DATA and the second serial data CH3/CH4 DATA respectively, and extracts necessary data portions therefrom. The clock reproducing circuit 100 receives the first serial data CH1/CH2 DATA and the second serial data CH3/CH4 DATA, and reproduces a clock signal CLOCK of a frequency "64fas" from the preamble of the received data. The first serial data CH1/CH2 DATA and the second serial data CH3/CH4 DATA are synchronous with each other, and the clock reproducing circuit 100 generates the clock signal CLOCK on the basis of one of the first serial data CH1/CH2 DATA and the second serial data CH3/CH4 DATA. In the case where one of the first serial data CH1/CH2 DATA and the second serial data CH3/CH4 DATA is present but the other is absent, the present serial data is preferentially used in generating the clock signal CLOCK. In addition, the clock reproducing circuit 100 generates a sync signal ASYNC in response to the first serial data CH1/CH2 DATA and the second serial data CH3/CH4 DATA. The output data from the serial decoders 101 and 102 are converted by the S/P converters 103 and 104 into corresponding 8-bit parallel data respectively. The output 8-bit parallel data from the S/P converter 103 and the output 8-bit parallel data from the S/P converter 104 are multiplexed by the multiplexer 105 in a time division manner. The output 8-bit parallel data from the multiplexer 105, the output clock signal CLOCK from the clock reproducing circuit 100, and the output sync signal ASYNC from the clock reproducing circuit 100 are transmitted to an external device. The output 8-bit parallel data from the multiplexer 105, the output clock signal CLOCK from the clock reproducing circuit 100, and the output sync signal ASYNC from the clock reproducing circuit 100 have a predetermined timing relation such as shown in FIG. 1.

The conversion into 8-bit data is adopted in view of the following facts. Processing 8-bit data is general, and a hardware for processing 8-bit data is usually simple. In a normal digital VTR, video data has an 8-bit parallel form. Thus, the conversion into 8-bit data enables a portion of the circuit to be used in common by a video processing circuit.

As is understood from the previous description, a complete digital audio output signal from the digital VTR has a parallel form including 8 bits for audio information data, 1 bit for a 48-KHz sync signal ASYNC, and 1 bit for a 768-KHz clock signal CLOCK. As shown in FIG. 1, the 8-bit audio information data the 48KHz sync signal ASYNC, and the 768-KHz clock signal CLOCK are in a fixed timing relation with each other. Each 16-bit audio data corresponding to a sample is divided into a byte "0" and a byte "1" before being transmitted. A byte "3" and a byte "4" are allotted to data for bit-number expansion, mode designation, and other purposes. Discrimination between channels is performed by referring to the 48-KHz sync signal ASYNC.

Figure 2:
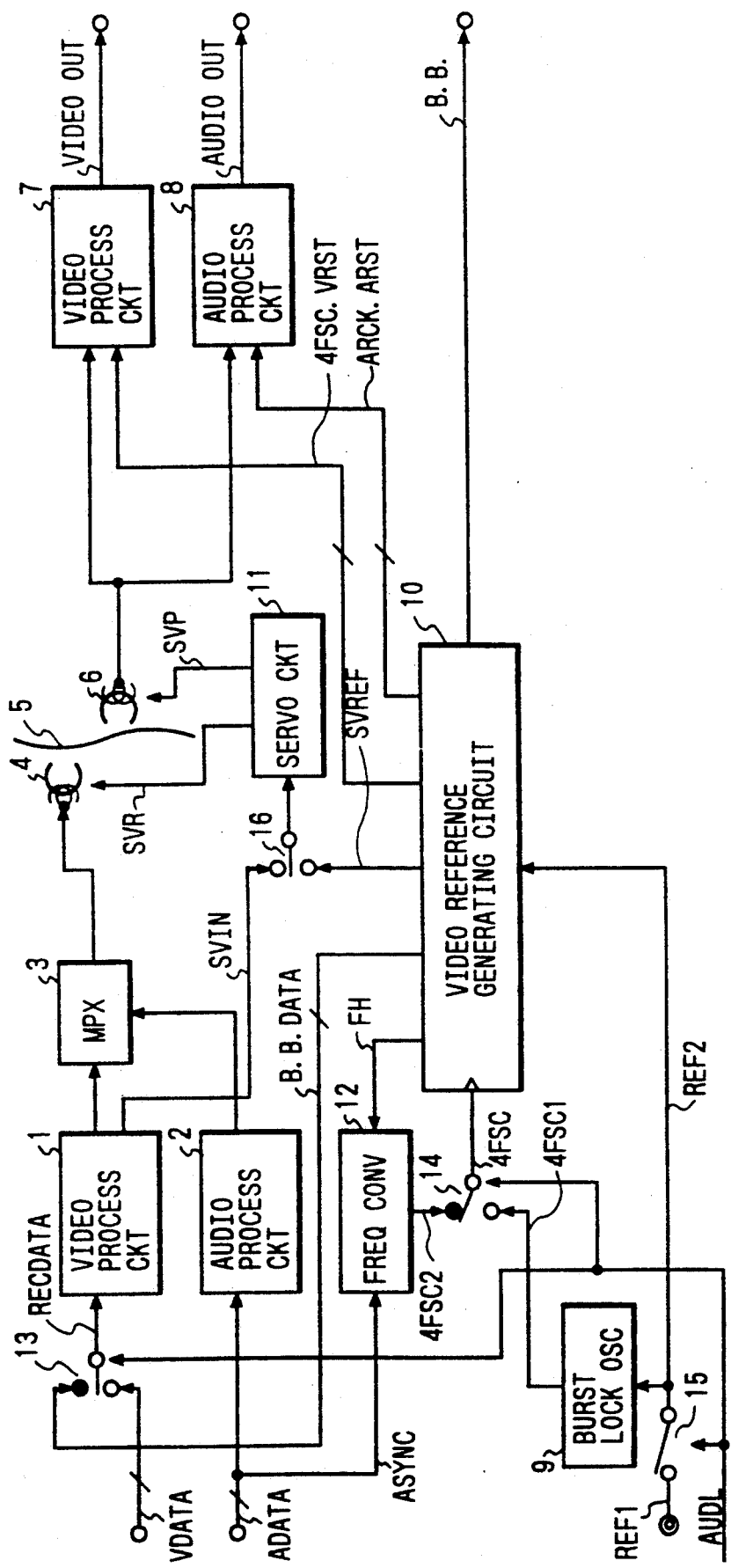
FIG. 2 is a block diagram of a video and audio data recording and reproducing apparatus according to a first embodiment of this invention.

With reference to FIG. 2, video and audio data recording and reproducing apparatus includes a video recording processing circuit 1, an audio recording processing circuit 2, a multiplexer 3, a recording head 4, a magnetic tape 5, a reproducing head 6, a video reproducing processing circuit 7, an audio reproducing processing circuit 8, a burst lock oscillator 9, a video reference generating circuit 10, a servo circuit 11, a frequency converting circuit 12, and switches 13, 14, 15, and 16.

A signal REF1 is a composite video signal which constitutes an output reference of a reproduced video signal, and which is inputted from an external signal source via a terminal (no reference character). The reference video signal REF1 contains sync and burst signals. The reference video signal REF1 is equal to or higher in level than a black burst in which all video information corresponds to a black level. The reference video signal REF1 is selected by the switch 15 as a reference video signal REF2 which is fed to the video reference generating circuit 10. The video reference generating circuit 10 detects horizontal and vertical sync signals, and a color framing phase and a subcarrier phase in a burst signal from the reference video signal REF2, and outputs signals of reproduction reference timings to the servo circuit 11, the audio reproducing processing circuit 8, and the video reproducing processing circuit 7. The video reference generating circuit 10 also outputs a black burst signal B.B. which is remade from a timing of the reference video signal REF2, and which includes sync and burst components having phases synchronous with the reference video signal REF2.

Audio data (audio-information data) ADATA to be recorded is inputted from a digital audio interface (not shown) via a terminal (no reference character). Video data (video-information data) VDATA is inputted via another terminal (no reference character). The video data VDATA is fed from a video digital interface, or is obtained by the analog-to-digital conversion of a recording video signal which includes a process of sampling the recording video signal with a predetermined sampling clock signal. The audio recording processing circuit 2 receives the input audio data ADATA, which has four channels and which is transmitted while being separated into eight bits. The audio recording processing circuit 2 separates the input audio data ADATA into data of a channel "1", data of a channel "2", data of a channel "3", and data of a channel "4". Then, the audio recording processing circuit 2 encodes the data of each channel into codes of a predetermined format, such as error-correcting codes, and outputs the audio-data codes to the multiplexer 3. The audio-data codes are fed to the recording head 4 via the multiplexer 3, being recorded on the magnetic tape 5 by the recording head 4. The recorded positions of the audio-data codes on the magnetic tape 5 are separated from the recorded positions of video data on the magnetic tape 5 by the operation of the multiplexer 3. As will be explained later, a servo-control reference for a normal recording process is generated on the basis of the recording video data VDATA. The video recording processing circuit 1 receives the input video data VDATA via the switch, and converts the input video data VDATA into codes of a predetermined format similarly to the encoding of the audio data ADATA. In addition, the video recording processing circuit 1 generates a recording servo reference timing signal SVIN on the basis of the input video data VDATA, and feeds the reference signal SVIN to the servo circuit 11 via the switch 16. During the normal recording process, the switch 16 allows the transmission of the reference signal SVIN from the video recording processing circuit 1 to the servo circuit 11, and the switch 13 selects the externally-fed video data VDATA as recording video data RECDATA fed to the video recording processing circuit 1.

During a normal reproducing process, the video reference generating circuit 10 feeds a reproduction reference timing signal SVREF to the servo circuit 11 via the switch 16, and the reproducing head 6 reproduces recorded data from the tape 5. The reproduced data outputted from the reproducing head 6 is decoded by the video reproducing processing circuit 7 and the audio reproducing processing circuit 8 into reproduced video data VIDEO-OUT and reproduced audio data AUDIO-OUT which are outputted to an external device (not shown).

The reference video signal REF2 transmitted via the switch 15 is also fed to the burst lock oscillator 9. The burst lock oscillator 9 generates a clock signal 4FSC1 on the basis of the burst signal in the reference video signal REF2. The clock signal 4FSC1 has a frequency equal to four times a color subcarrier frequency, and is phase-locked to the burst signal. During the normal reproducing process, the output clock signal 4FSC1 is selected by the switch 14 as a clock signal 4FSC fed to the video reference generating circuit 10. Thus, the video reference generating circuit 10 remakes a signal representative of a reference video reproduction timing in response to the clock signal 4FSC and the reference video signal REF2, and generates the black burst signal B.B. which can be used as a video reference for an external equipment (not shown). In addition, the video reference generating circuit 10 feeds a timing start pulse signal VRST for video output and a video processing clock signal 4FSC to the video reproducing processing circuit 7. Furthermore, the video reference generating circuit 10 feeds a timing start pulse signal ARST for audio output and an audio processing clock signal ARCK to the audio reproducing processing circuit 8. The video timing start pulse signal VRST, the audio timing start signal ARST, the video processing clock signal 4FSC, and the audio processing clock signal ARCK are synchronous with the black burst signal B.B.

While the normal recording process and the normal reproducing process in this embodiment are similar to those in a prior art recording and reproducing apparatus, an editing process in this embodiment is different from that in the prior art recording and reproducing apparatus. For example, the editing process is equal to a process of inserting new video information into recorded video information on a magnetic tape, or a process of re-recording a part of recorded information on the magnetic tape. It is known that recording video signal data VDATA or a reference video signal REF1 is used as a reference in such an editing process. This embodiment has a new mode of operation which is not taught by the prior art. During the new mode of operation, a recording timing is controlled in response to an input sync signal or an input clock signal from a digital audio interface.

In the case where audio data ADATA is asynchronous with video data VDATA or a reference video signal REF1, and in the case where video data VDATA or a reference video signal REF1 is absent, the switches 13, 14, and 15 are changed by a control signal AUDL. Specifically, the switch 14 is changed so as to feed an output clock signal 4FSC2 from the frequency converting circuit 12 to the video reference generating circuit 10 as a clock signal 4FSC. The frequency converting circuit 12 receives sync components ASYNC of the input audio data ADATA from the digital audio interface, and generates the clock signal 4FSC2 on the basis of the sync components ASYNC of the audio data ADATA. The clock signal 4FSC2 has a frequency equal to four times the color subcarrier frequency fsc. In the NTSC television system, the relation between the color subcarrier frequency fsc and the horizontal frequency fh is given by the previously-mentioned equation (5). In the PAL television system, the relation between the color subcarrier frequency fsc and the horizontal frequency fh is given by the previously-mentioned equation (6). The sync components ASYNC have a frequency equal to the audio signal sampling frequency fas, that is, 48 KHz. Thus, in the NTSC television system, by referring to the previously-mentioned equations (1) and (5), the relation between the frequency 4fsc of the clock signal 4FSC2 and the audio signal sampling frequency fas is given as follows.

$$4fsc = (170625/572)fas \tag{7}$$

In the PAL television system, by referring to the previously-mentioned equations (2) and (6), the relation between the frequency 4fsc of the clock signal 4FSC2 and the audio signal sampling frequency fas is given as follows.

$$4fsc = (709379/1920)fas \tag{8}$$

The frequency converting circuit 12 includes a combination of a frequency divider and a frequency multiplier cooperating to provide a frequency ratio in the equation (7) or (8). For example, the frequency multiplier includes a PLL (phase-locked loop).

It should be noted that the clock signal 4FSC2 may be generated by converting the frequency of a clock signal fed from a digital audio interface. The clock signal of FIG. 1 which is fed from the digital audio interface has a frequency fack of 768 KHz, and the clock signal frequency fack is related with the audio signal sampling frequency fas as follows.

$$fack = 16 fas \tag{9}$$

The equations (7), (8), and (9) give the relation between the frequency fack of the digital-interface clock signal and the frequency 4fsc of the clock signal 4FSC2 in the NTSC system or the PAL system. This frequency ratio is used in the frequency converting circuit 12.

It should be noted that the frequency 4fsc of the clock signal 4FSC2 may be controlled as follows. The video reference generating circuit 10 divides the frequency 4fsc of the input clock signal 4FSC2 with a factor corresponding to the frequency ratio in the previously-mentioned equation (5) or (6), and thereby generates a first pulse signal FH with a frequency corresponding to the horizontal frequency fh. The first pulse signal FH is outputted from the video reference generating circuit 10 to the frequency converting circuit 12. The frequency converting circuit 12 generates a second pulse signal on the basis of the sync signal ASYNC by referring to the frequency relation in the previously-mentioned equation (1) or (2), the second pulse signal having a frequency equal to the horizontal frequency fh. The frequency converting circuit 12 compares the frequency of the first pulse signal and the frequency of the second pulse signal, and controls the frequency of the output clock signal 4FSC2 in response to the result of the frequency comparison so that the frequency of the first pulse signal will be locked to the frequency of the second pulse signal.

In the case where the audio data ADATA is asynchronous with the video data VDATA or the reference video signal REF1, and in the case where the video data VDATA or the reference video signal REF1 is absent, the switch 13 is changed together with the switch 14. Specifically, the switch 13 is changed so as to feed timing data B.B.DATA from the video reference generating circuit 10 to the video recording processing circuit 1 instead of the recording video data VDATA. The timing data B.B.DATA is a base for the black burst signal B.B. In the presence of a function of converting an analog video signal into a digital video signal and recording the digital video signal, the switch 13 may be changed so that the black burst signal B.B. will be fed instead of the analog video signal. The switch 15 is changed together with the switch 13. Specifically, the switch 15 is opened so that the feed of the reference video signal REF2 to the video reference generating circuit 10 will be interrupted. In this case, the operation of the video reference generating circuit 10 moves into an internal mode or a self-running mode where a continuous video reference timing signal is internally and automatically generated.

Figure 3:
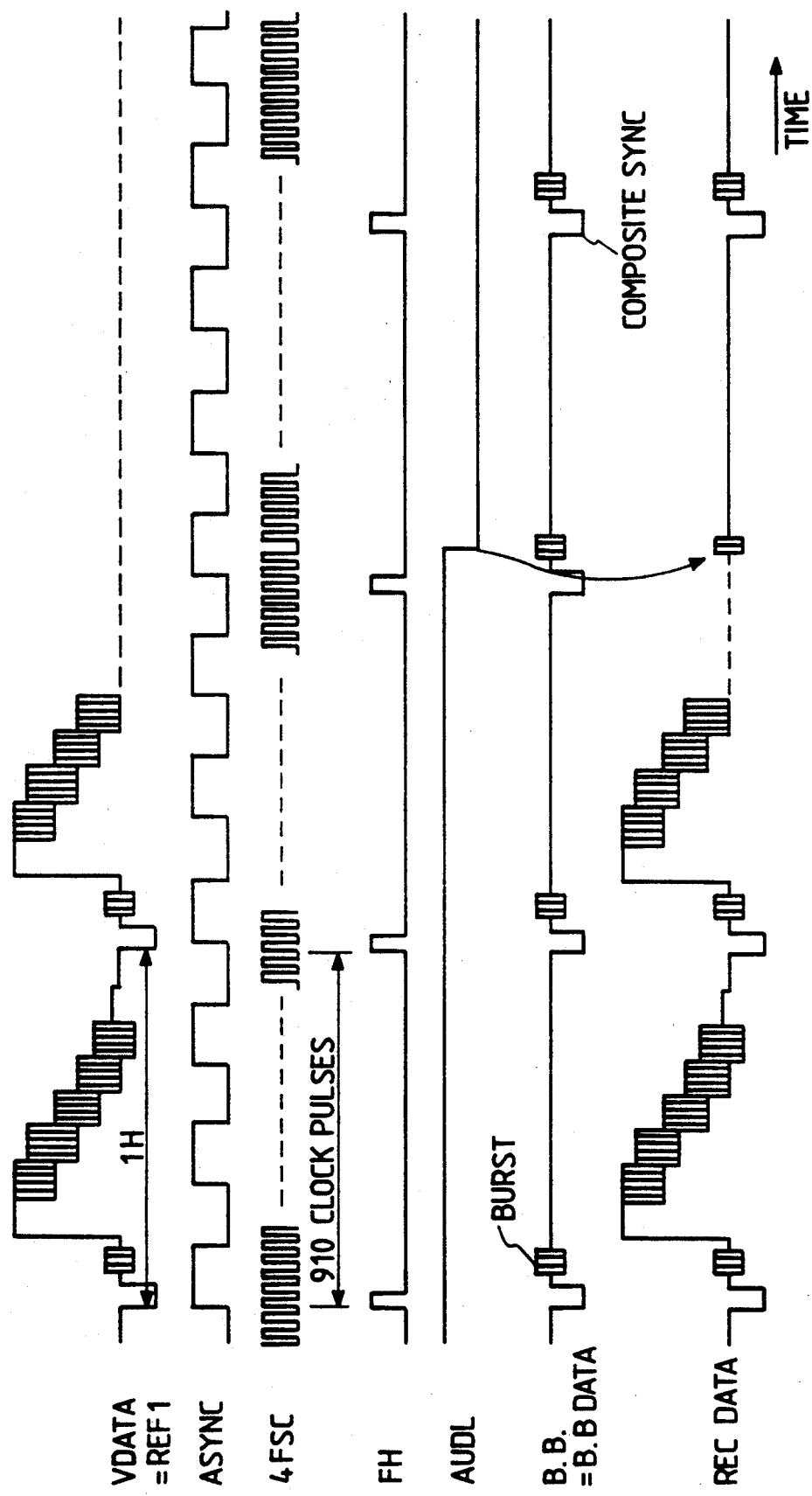
FIG. 3 is a timing diagram showing the waveforms of signals in the apparatus of FIG. 2.

A further description will be given with reference to FIG. 3. In FIG. 3, video data VDATA for a VTR recording reference is shown as a color burst signal. During the normal operation, the reference video signal REF1 is equal to the video data VDATA. Under conditions where the recording video data VDATA and the reference video signal REF1 are absent but audio data ADATA is inputted from a digital audio interface, when a recording process or an after-recording process is required to be done, a suitable device (not shown) detects the absence of the video data VDATA and the video signal REF1 and changes the logic level of the control signal AUDL from "H" to "L" in response thereto. This change of the control signal AUDL causes the switches 13, 14, and 15 to move into positions corresponding to the new mode of operation.

Figure 12:
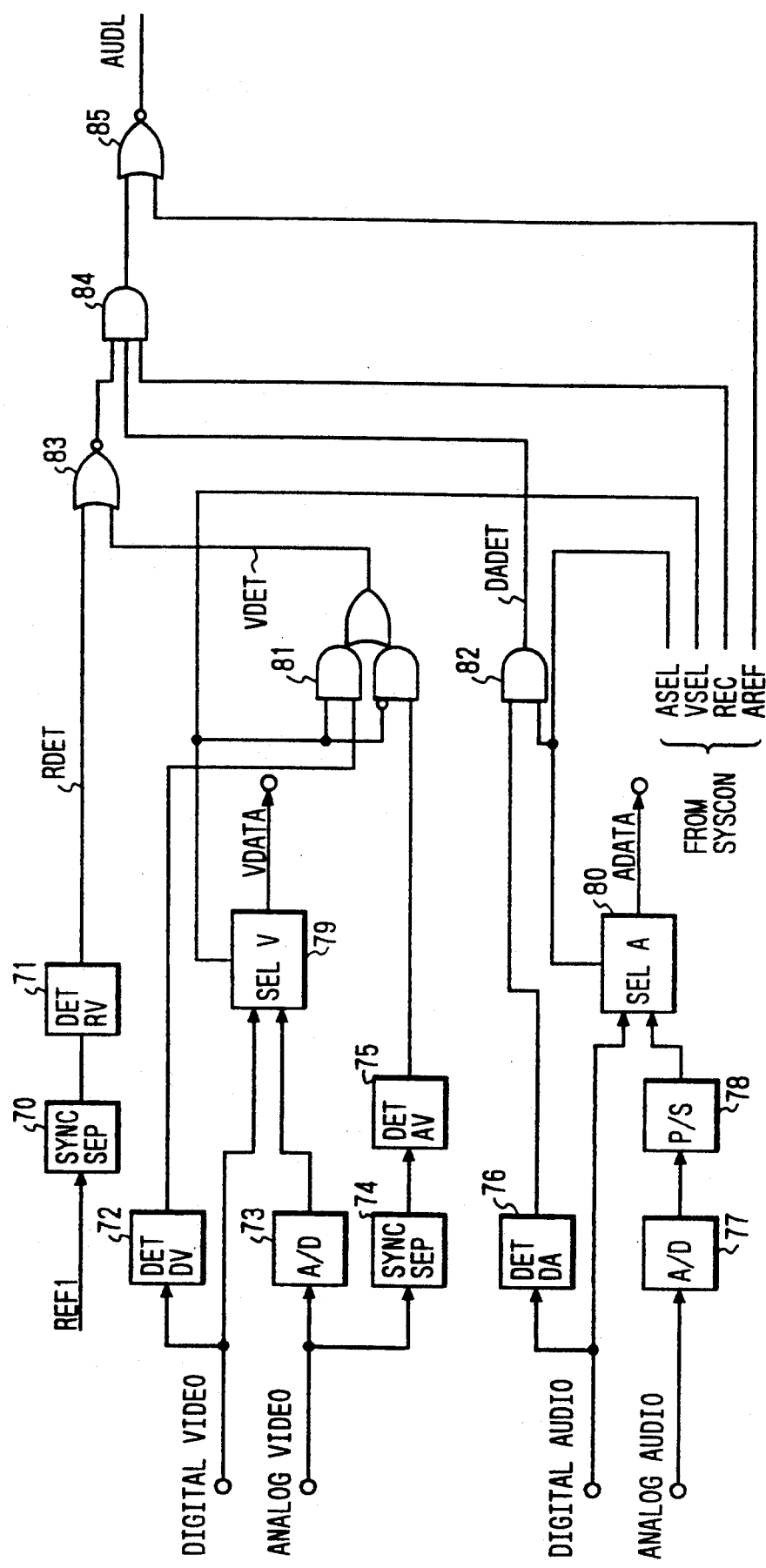
FIG. 12 is a block diagram of a circuit for generating a control signal AUDL.

FIG. 12 shows a circuit for generating the control signal AUDL. In FIG. 12, sync signal separating circuits 70 and 74 serve to separate sync signals from the reference signal REF1 and the analog video signal respectively. Detection circuits 71 and 75 following the sync signal separating circuits 70 and 74 serve to detect the presence and absence of the separated sync signals. Specifically, the detection circuits 71 and 75 output "H" when video signals having normal sync signals are inputted. Otherwise, the detection circuits 71 and 75 output "L". An analog-to-digital (A/D) converter 73 converts the analog input recording video signal into a corresponding digital signal. An analog-to-digital (A/D) converter 77 converts the analog input recording audio signal into a corresponding digital signal. Detection circuits 72 and 76 serve to detect the presence and absence of the digital video signal and the digital audio signal respectively. Specifically, the detection circuits 72 and 76 output "H" when digital signals are inputted. Otherwise, the detection circuits 72 and 76 output "L". A parallel-to-serial (P/S) converter 78 transforms the output parallel-form digital signal from the A/D converter 77 into a corresponding serial-form digital signal. A selector 79 serves to select one of the externally-applied digital video signal and the output digital video signal from the A/D converter 73 as recording video data VDATA. In other words, the selector 79 serves to select one of the digital input video signal and the analog input video signal. A selector 80 serves to select one of the externally-applied digital audio signal and the output digital audio signal from the P/S converter 78 as recording audio data ADATA. In other words, the selector 80 serves to select one of the digital input audio signal and the analog input audio signal. A gate 81 executes a predetermined logic operation among the output signals from the detection circuits 72 and 75 and a signal VSEL, and thereby outputs a signal VDET. The signal VSEL is fed from a system controller SYSCON (not shown) which provides an interface in the operation of the digital VTR. A gate 82 executes a predetermined logic operation between the output signal from the detection circuit 76 and a signal ASEL. The signal ASEL is fed from the system controller SYSCON. A gate 83 executes a predetermined logic operation between the output signals from the detection circuit 71 and the gate 81. The gate 84 executes a predetermined logic operation among the output signals from the gates 82 and 83 and a signal REC. The signal REC is fed from the system controller SYSCON. A gate 85 executes a predetermined logic operation between the output signal from the gate 84 and a signal AREF, and thereby outputs the control signal AUDL. The signal AREF is fed from the system controller SYSCON.

The data selections by the selectors 79 and 80 are controlled in response to the signals VSEL and ASEL respectively. Specifically, the digital input signals are selected by the selectors 79 and 80 when the signals VSEL and ASEL are "H". Video data and audio data having a plurality of channels can be recorded. Simultaneously recording analog channels and digital channels can be done. For simplicity, a further description will be given of the case of one channel. The detection circuit 71 outputs a signal RDET which represents the presence and absence of the reference signal REF1. The gate 81 outputs a signal VDET which represents the presence and absence of an input video signal. Specifically, the signal VDET assumes "H" in the presence of an input video signal. Otherwise, the signal VDET assumes "L". The gate 82 outputs a signal DADET. The signal DADET assumes "H" in the case where data from a digital interface is selected as recorded audio data and also the input signal is present. Otherwise, the signal DADET assumes "L". In the case of recording data of a plurality of channels, the signal DADET assumes "H" when at least one channel satisfies the above-mentioned conditions, and the signal DADET assumes "L" otherwise. The signal REC remains "H" during the recording process. The signal AREF is "H" when data from a digital interface is preferentially used as a reference for the record and reproduction.

In the video reference generating circuit 10, the black burst signal B.B. for a video output reference is generated from the clock signal 4FSC. In the NTSC television system, the horizontal period given by the signal FH corresponds to 910 clock pulses as shown in FIG. 3, and the frequency of the burst signal is equal to one fourth of the clock signal. In the absence of the recording video signal data, the switch 14 is changed by the control signal AUDL so that the output clock signal 4FSC2 from the frequency converting circuit 12 will be selected as the clock signal 4FSC fed to the video reference generating circuit 10. The black burst signal B.B. is continuously generated from the clock signal 4FSC. At the same time, the output timing data B.B.DATA from the video reference generating circuit 10 is selected by the switch 13 as the recording video data RECDATA fed to the video recording processing circuit 1.

According to this embodiment, even in the absence of an external recording video reference, an internal recording video reference is generated in synchronism with a fixed-timing component of the audio data from the digital audio interface, and the internal recording video reference is fed to the video recording processing circuit 1. Thus, the multiplexer 3 and the servo circuit 11 can be prevented from operating asynchronously with the audio data, and it is possible to prevent the recorded audio data from partially dropping out or being discontinuous.

Figure 4:
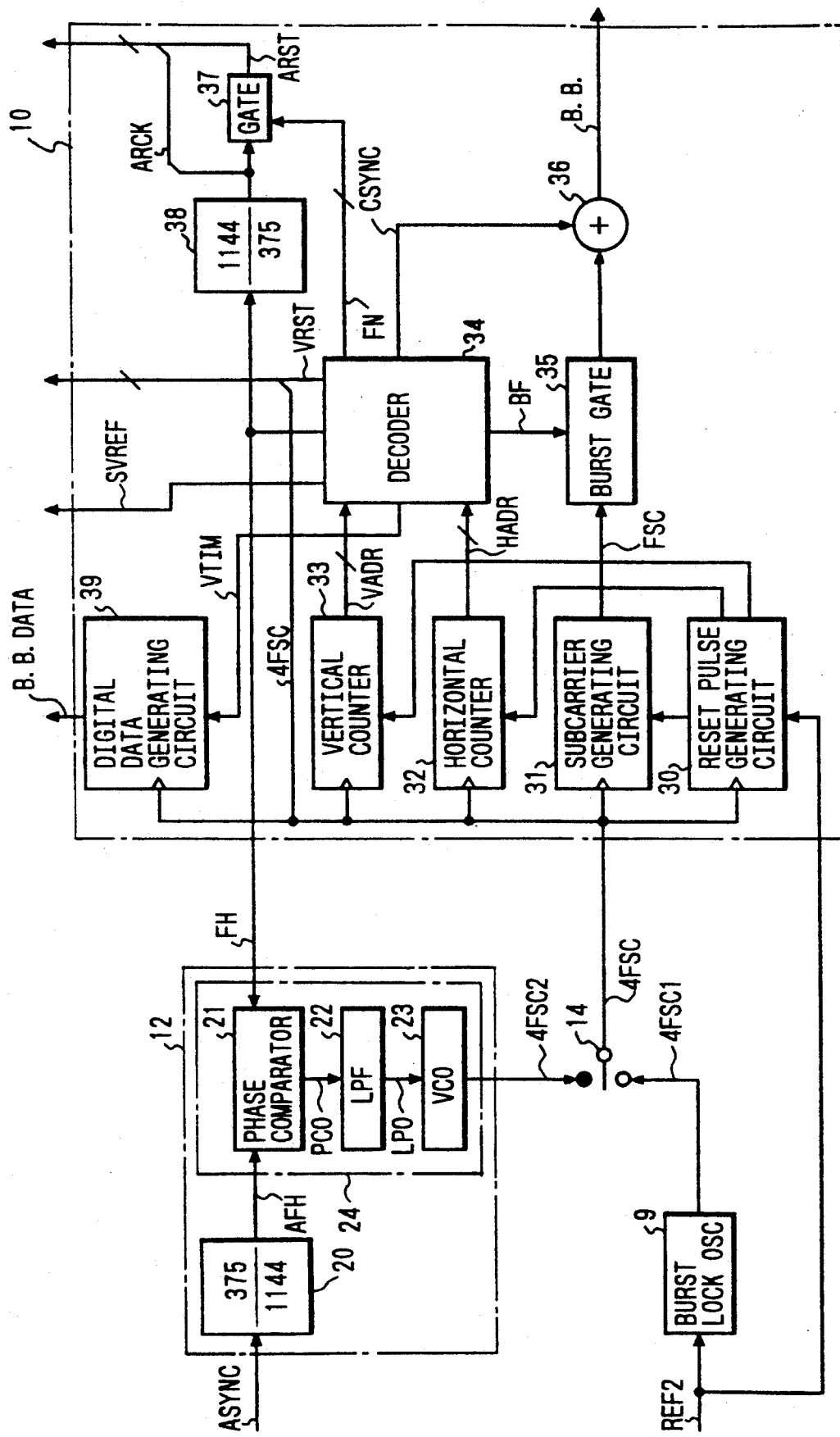
FIG. 4 is a block diagram showing the details of the frequency converting circuit and the video reference generating circuit of FIG. 2.

A detailed description will be given of the frequency converting circuit 12 and the video reference generating circuit 10 with reference to FIG. 4. As shown in FIG. 4, the video reference generating circuit 10 includes a reset pulse generating circuit 30 for determining the phase of a video reference, a subcarrier generating circuit 31 for frequency-dividing the clock signal 4FSC to generate a color subcarrier, a horizontal counter 32 for counting horizontal periods by referring to the clock signal 4FSC, a vertical counter 33 for counting vertical periods, a decoder 34, a burst gate 35, an adder 36, a gate 37, a frequency converter 38, and a digital data generating circuit 39 for generating the recording reference video data B.B.DATA. As shown in FIG. 4, the frequency converting circuit 12 includes a frequency converter 20, a phase comparator 21, a low pass filter 22, and a voltage-controlled oscillator 23.

In the frequency converting circuit 12, the frequency converter 20 converts the sync signal ASYNC into a horizontal pulse signal AFH having a frequency equal to the horizontal frequency fh. The frequency converter 20 uses a frequency conversion ratio of 375/1144 in the case of the NTSC television system. The horizontal pulse signal AFH is fed to the phase comparator 21. The phase comparator 21, the low pass filter 22, the voltage-controlled oscillator 23, the switch 14, and a part of the video reference generating circuit 10 compose a PLL circuit 24. The output signal from the phase comparator 21 is fed to the voltage-controlled oscillator 23 via the low pass filter 22. The voltage-controlled oscillator 21 generates the clock signal 4FSC2 in response to the output signal from the phase comparator 21, and outputs the clock signal 4FSC2 to the video reference generating circuit 10 via the switch 14. In the video reference generating circuit 10, the clock signal 4FSC2 is converted into a pulse signal FH through a frequency dividing process, the pulse signal FH having a frequency corresponding to the horizontal frequency fh. The pulse signal FH is outputted to the phase comparator 21. The phase of the pulse signal AFH and the phase of the pulse signal FH are compared by the phase comparator 21 so that the frequency of the clock signal 4FSC2 will have a fixed relation with the frequency of the sync component ASYNC of the input audio data.

In the video reference generating circuit 10, the subcarrier generating circuit 31 generates a subcarrier FSC in response to the clock signal 4FSC fed via the switch 14. The horizontal counter 32 generates horizontal phase information data HADR in response to the clock signal 4FSC. The vertical counter 33 generates vertical phase information data VADR in response to the clock signal 4FSC. The subcarrier FSC, the horizontal phase information data HADR, and the vertical phase information data VADR constitute basic video references. The decoder 34 generates the horizontal pulse signal FH, timing data VTIM, a servo-control timing signal SVREF, a video reproducing reset pulse signal VRST, a field number signal FN, a composite sync signal CSYNC, and a burst flag signal BF on the basis of the horizontal phase information data HADR and the vertical phase information data VADR. The field number signal FN represents video phase information for matching the audio reproduction phase to the video reproduction phase. The burst gate 35 gates the subcarrier FSC in response to the burst flag signal BF, generating a burst signal from the subcarrier FSC and outputting the burst signal to the adder 36. The adder 36 combines the burst signal and the composite sync signal CSYNC into the black burst signal B.B. which is a video reference signal fed to an external equipment (not shown). The black burst signal B.B. has a waveform such as shown in FIG. 3.

In the video reference generating circuit 10, the reset pulse generating circuit 30 detects desired timings of resetting the subcarrier generating circuit 31, the horizontal counter 32, and the vertical counter 33 by referring to the reference video signal REF2, and generates reset timing signals representative thereof. In the case where the recording is done by using the audio data ADATA as a reference, the reference video signal REF2 is absent and the reset pulse generating circuit 30 does not output any reset timing signals. In this case, the subcarrier generating circuit 31 and the counters 32 and 33 move into a self-running mode of operation where suitable reset signals are internally generated. The frequency converter 38 converts the horizontal pulse signal FH into the digital-audio reproduced clock signal ARCK. The frequency converter 38 uses a frequency conversion ratio of 1144/375 in the case of the NTSC television system. The gate 37 gates the clock signal ARCK in response to the field number signal FN, generating the reset pulse signal ARST from the clock signal ARCK. The reset pulse signal ARST determines the digital audio reproduction phase. The digital data generating circuit 39 generates the recording video data B.B.DATA on the basis of the clock signal 4FSC and the timing data VTIM fed from the decoder 34. The contents of the recording video data B.B.DATA are equal to the contents of data obtained by the analog-to-digital conversion of the black burst signal B.B. which is executed at a sampling frequency equal to the frequency 4fsc. The recording video data B.B.DATA is used as a recording reference in a process of recording audio data during, for example, the after-recording of the audio data. In the case of an unused magnetic tape (a virgin magnetic tape), the video data B.B.DATA is recorded as a reproduction reference for stably reproducing audio data.

Figure 13:
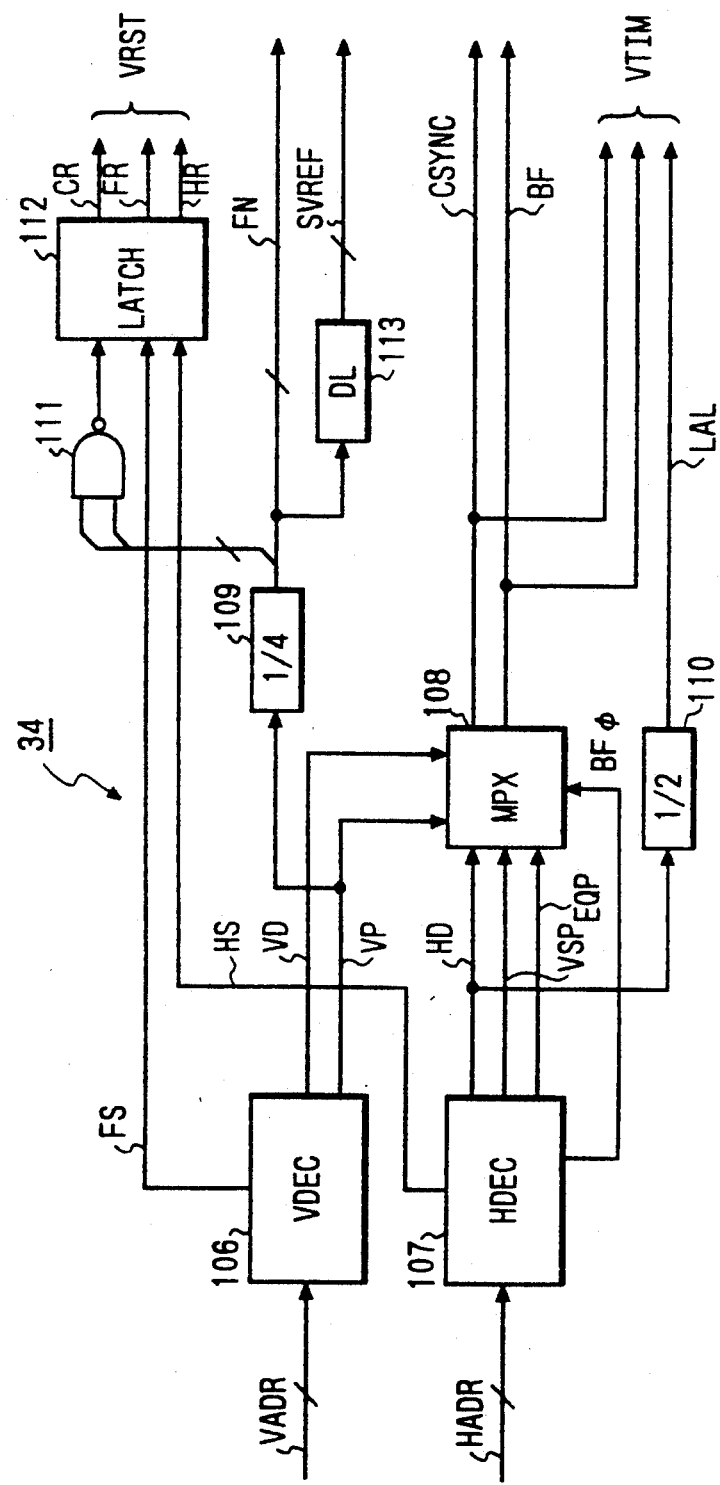
FIG. 13 is a block diagram of the decoder of FIG. 4.

As shown in FIG. 13, the decoder 34 includes a vertical address decoder 106, a horizontal address decoder 107, a multiplexer 108, frequency dividers 109 and 110, a NAND gate 111, a latch circuit 112, and a delay circuit 113.

Figure 14:
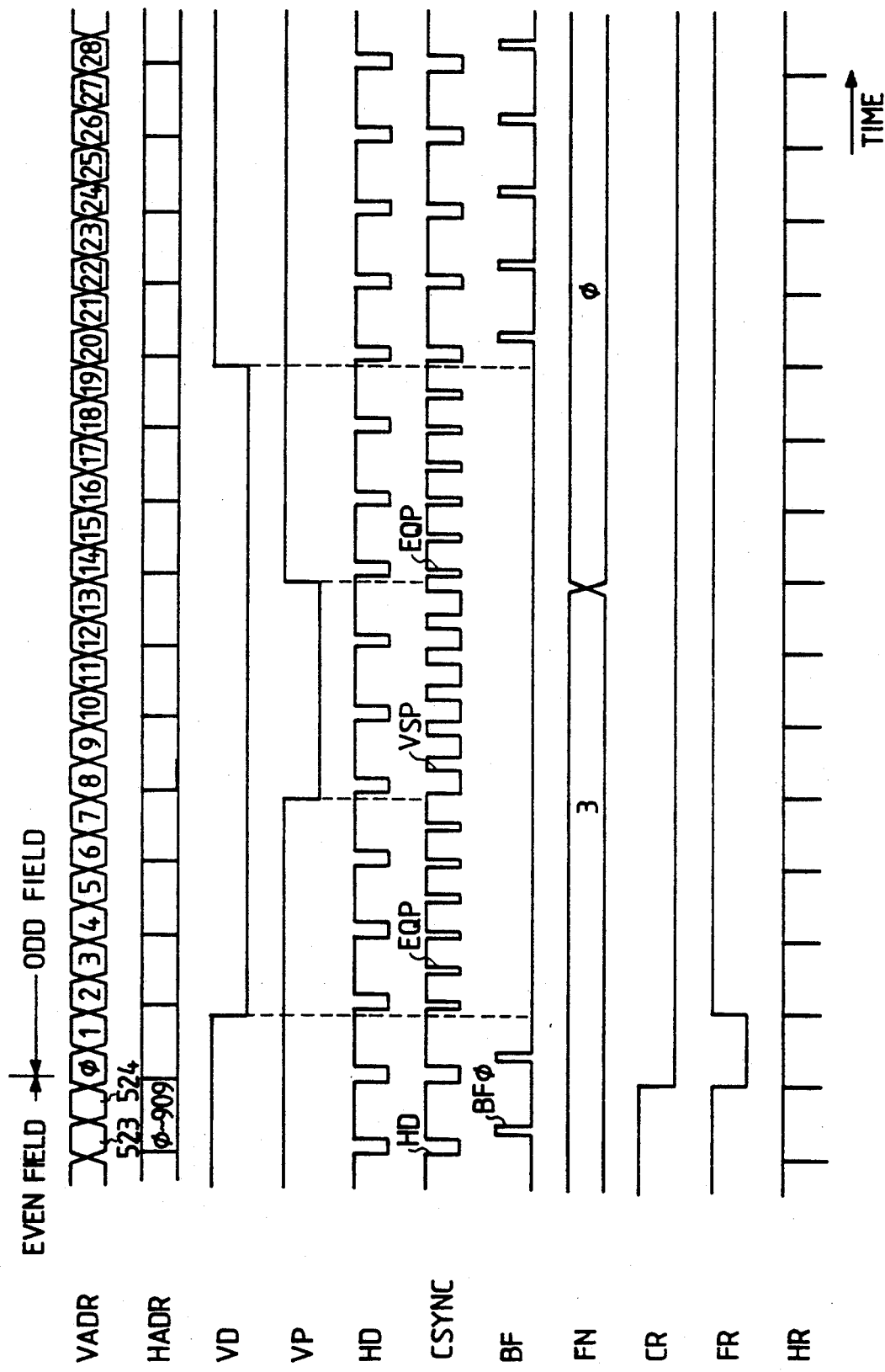
FIG. 14 is a timing diagram showing the waveforms of various signals in the decoder of FIG. 13 which occur during a head of an odd field in a video field sequence.
Figure 15:
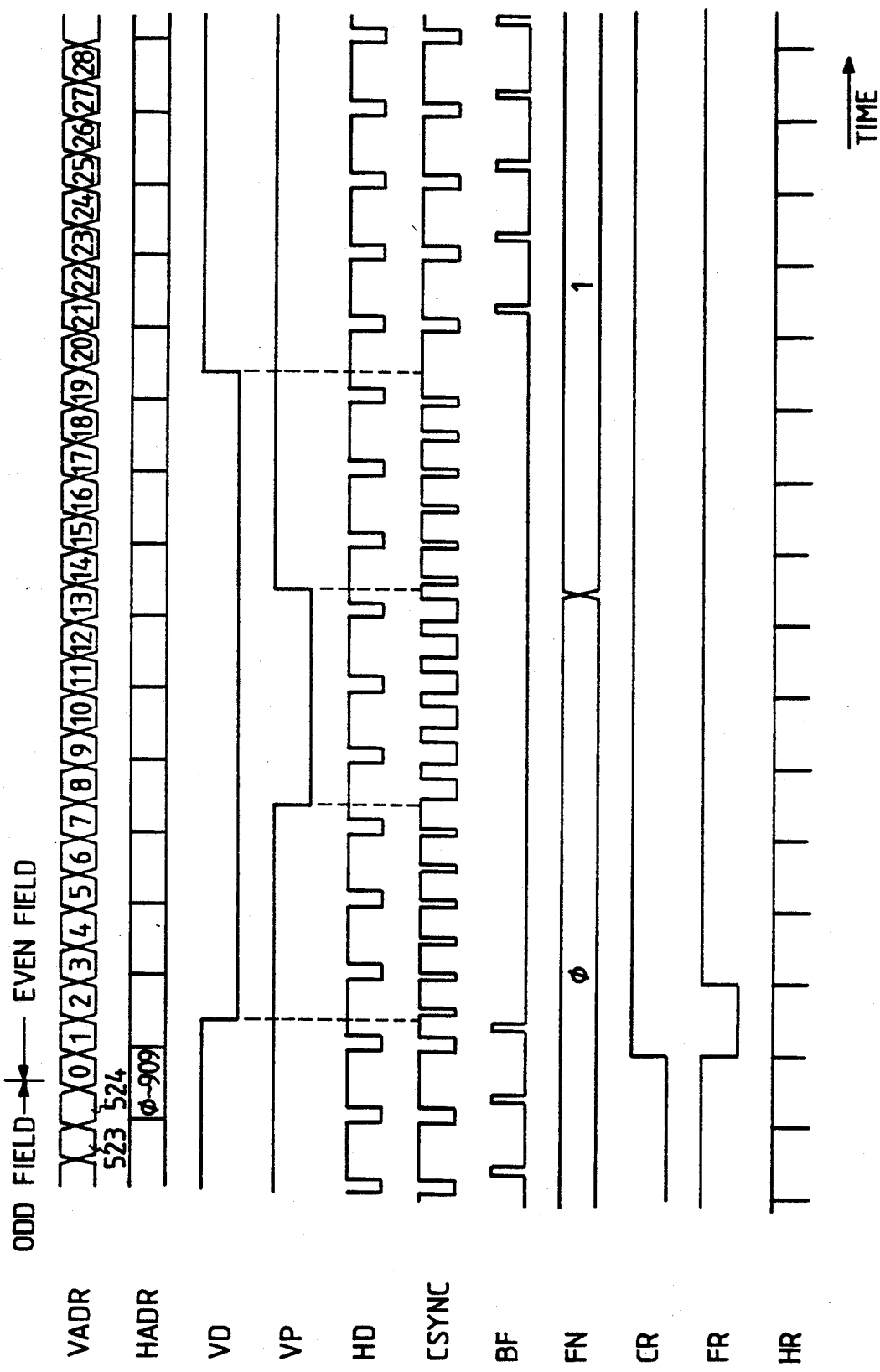
FIG. 15 is a timing diagram showing the waveforms of the signals in the decoder of FIG. 13 which occur during a head of an even field in the video field sequence.

FIG. 14 shows the waveforms of various signals in the decoder 34 which occur during a head of an odd field in a video field sequence. FIG. 15 shows the waveforms of the signals in the decoder 34 which occur during a head of an even field in the video field sequence.

The decoder 34 will be further described with reference to FIGS. 13-15. The vertical address decoder 106 in the decoder 34 executes a count-up process twice for each horizontal period, decoding the vertical phase information data (the vertical address) VADR and generating pulse signals VP and VD (see FIGS. 14 and 15) in response to the vertical phase information data VADR. The pulse signal VP represents a vertical sync signal interval. The pulse signal VD represents an interval into which an equalizing pulse signal should be inserted. The horizontal address decoder 107 in the decoder 34 decodes the horizontal phase information data (the horizontal address) HADR, generating a pulse signal HD, a burst interval pulse signal BFO, an equalizing pulse signal EQP, and a vertical sync pulse signal VSP on the basis of the horizontal phase information data HADR. The pulse signal HD assumes "L" at a head of each horizontal period as shown in FIGS. 14 and 15. The equalizing pulse signal EQP includes a pulse component which repeats twice for each horizontal period. The multiplexer 108 changes or selects one of the pulse signals HD, EQP, and VSP in response to the pulse signals VP and VD, and thereby outputs the composite sync signal CSYNC. With reference to FIGS. 14 and 15, during the presence of a pulse of the signal VP, the multiplexer 108 selects the pulse signal VSP. During the absence of a pulse of the signal VP and the presence of a pulse of the signal VD, the multiplexer 108 selects the equalizing pulse signal EQP. These processes by the multiplexer 108 causes the generation of the composite sync signal CSYNC of FIGS. 14 and 15. In addition, the multiplexer 108 inhibits or blocks the pulse signal BFO in response to the pulse signal VD at a burst position in a horizontal period, and thereby generates the burst flag signal BF which is fed to the burst gate 35 of FIG. 4.

The frequency divider 109 generates the field number signal FN from the pulse signal VP by a frequency dividing process. The frequency divider 110 generates a line alternating pulse signal LAL from the pulse signal HD by a frequency dividing process. The line alternating pulse signal LAL is inverted in logic level for each horizontal period, determining the phase relation between the color subcarrier and the horizontal edge. The NAND gate 111 detects a start field of a color frame by referring to the output signal from the frequency divider 109. The latch circuit 112 generates a horizontal reset pulse signal HR, a field reset pulse signal FR, and a color frame reset pulse signal CR on the basis of an output signal HS from the horizontal address decoder 107, an output signal FS from the vertical address decoder 106, and the output signal from the NAND gate 111. The signals HR, FR, and CR are video references, and have waveforms such as shown in FIGS. 14 and 15. The latch circuit 112 synchronizes these signals HR, FR, and CR composing the timing signal VRST which is fed to the video reproducing processing circuit 7 of FIG. 2 and which determines the output timing of the video data.

The delay circuit 113 generates the reproduction reference timing signal SVREF by suitably delaying the output signal from the frequency divider 109. In a general digital VTR, the speed of a drum provided with a rotary head is controlled is synchronism with a video field, and the reproduction timing is controlled by suitably setting the phase of the field number signal FN.

The pulse signals CSYNC, BF, and LAL compose the timing data VTIM which is used by the digital data generating circuit 39 of FIG. 4 in generating the black burst data B.B.DATA. For example, the digital data generating circuit 39 includes a counter and a ROM storing inclination data. In the digital data generating circuit 39, the counter serves to detect an interval of several clocks in response to variation points of the pulse signals CSYNC and BF, and the inclination data is read out from the ROM by using the output signal from the counter as an address fed to the ROM. As a result of this process, burst envelope data and composite sync data having an inclination are obtained. The black burst data B.B.DATA can be obtained by multiplying the burst envelope data and color subcarrier data to generate burst data, and by adding the burst data and the composite sync data. The color subcarrier data agrees with data representing sinusoidal waves having a period equal to the color subcarrier period. The generation of the black burst data B.B.DATA is shown, for example, in U.S. application Ser. No. 789,069, U.S. application Ser. No. 853,304, or Japanese published unexamined patent application 62-18586, the disclosure of which is hereby incorporated by reference. As described previously, the pulse signal LAL is used in determining the phase relation between the composite sync data and the color subcarrier data. The time portions of the black burst data B.B.DATA except the sync and burst parts agree with blanking level data, and thus they can be generated easily.

The digital data generating circuit 39 for generating the black burst data B.B.DATA representing a video signal containing burst components may be omitted, and be replaced by another simple circuit.

Figure 16:
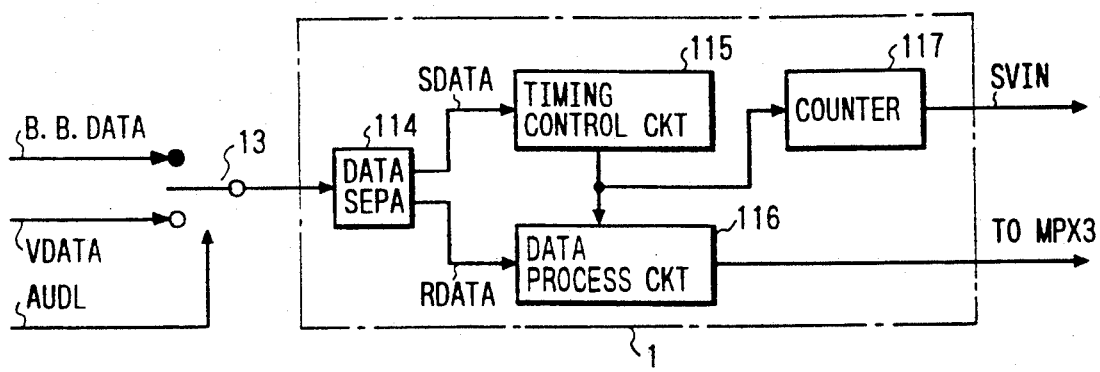
FIG. 16 is a block diagram of the video recording processing circuit of FIG. 2.

As shown in FIG. 16, the video recording processing circuit 1 includes a data separating circuit 114, a recording timing processing circuit, a recording data processing circuit 116, and a counter 117. The counter 117 functions to generate the recording servo reference timing signal SVIN on the basis of the output signal from the recording timing processing circuit 115. The data separating circuit 114 separates the input video data into data of a sync signal portion and data of an image information portion. The recording timing processing circuit 115 detects a timing reference of the video data by referring to the separated data of the sync signal portion, and generates a timing pulse signal representing the detected reference. The generated timing pulse signal has a format similar to the format of the reproduction reference timing signal VRST, and includes, for example, a horizontal reset pulse signal, a field reset pulse signal, and a color frame reset pulse signal. The recording data processing circuit 116 rearranges the separated data of the image information portion and converts the data into error-correcting codes in response to references determined by the output pulse signal from the recording timing processing circuit 115. The output data of the recording data processing circuit 116 which results from the above-mentioned data processing is fed to the multiplexer 3 of FIG. 2.

Figure 17:
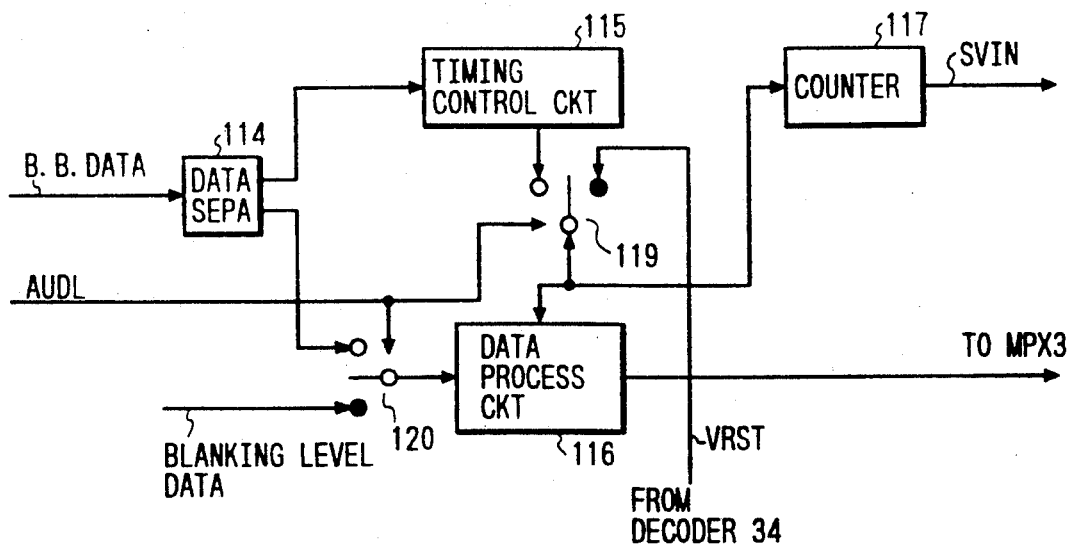
FIG. 17 is a block diagram showing a modification of the embodiment of FIGS. 2 and 16.

FIG. 17 shows a modification of this embodiment which includes switches 119 and 120 in place of the switch 13 of FIG. 2. The switch 119 serves to change a reference timing signal. The switch 120 serves to change data of an image information portion. In the case where the control signal AUDL instructs the recording of the black burst signal in accordance with the reproduction reference signal, since the actually-recorded data agrees with the data of the image information portion )the data corresponding to a blanking level in the case of a black burst signal) other than the data of the sync signal portion, the generation of the black burst data is unnecessary. Accordingly, in this case, the switch 120 replaces the data of the image information portion by blanking level data corresponding to a fixed level. In addition, since various timing signals for the recording process are similar to the reproduction reference signals, the switch 119 replaces the output timing signal from the recording timing processing circuit 115 by the output timing signal VRST from the decoder 34 of FIG. 4.

As described previously, according to this embodiment, the frequency converter 20 in the frequency conversion circuit 12 converts the sync signal ASYNC into the horizontal pulse signal AFH having a frequency equal to the horizontal frequency fh. The horizontal pulse signal AFH is fed to the phase comparator 21. The phase comparator 21, the low pass filter 22, the voltage-controlled oscillator 23, the switch 14, and a part of the video reference generating circuit 10 compose the PLL circuit 24. The output signal from the phase comparator 21 is fed to the voltage-controlled oscillator 23 via the low pass filter 22. The voltage-controlled oscillator 21 generates the clock signal 4FSC2 in response to the output signal from the phase comparator 21, and outputs the clock signal 4FSC2 to the video reference generating circuit 10 via the switch 14. In the video reference generating circuit 10, the clock signal 4FSC2 is converted into the pulse signal FH through a frequency dividing process, the pulse signal FH having a frequency corresponding to the horizontal frequency fh. The pulse signal FH is outputted to the phase comparator 21. The phase of the pulse signal AFH and the phase of the pulse signal FH are compared by the phase comparator 21 so that the frequency of the clock signal 4FSC2 will have a fixed relation with the frequency of the sync component ASYNC of the input audio data. The video reference generating circuit 10 is provided with the circuit for generating the horizontal pulse signal FH from the clock signal of the frequency 4fsc to obtain the black burst signal B.B. This circuit in the video reference generating circuit 10 is used in common for the PLL circuit 24, and thus it is unnecessary to provide the frequency converting circuit 12 with a circuit for generating a horizontal pulse signal FH from the clock signal 4FSC2. Accordingly, the combination of the frequency converting circuit 12 and the video reference generating circuit 10 can be made on a small scale. The frequency converter 20 can be used in common for generating a reference signal of a horizontal frequency fh from a clock signal of a sampling frequency fas, the reference horizontal frequency signal being compared in phase to the horizontal pulse signal FH in a PLL for generating the sampling clock signal from the horizontal pulse signal FH, the sampling clock signal being used in the analog-to-digital conversion of an analog audio signal.

Figure 5:
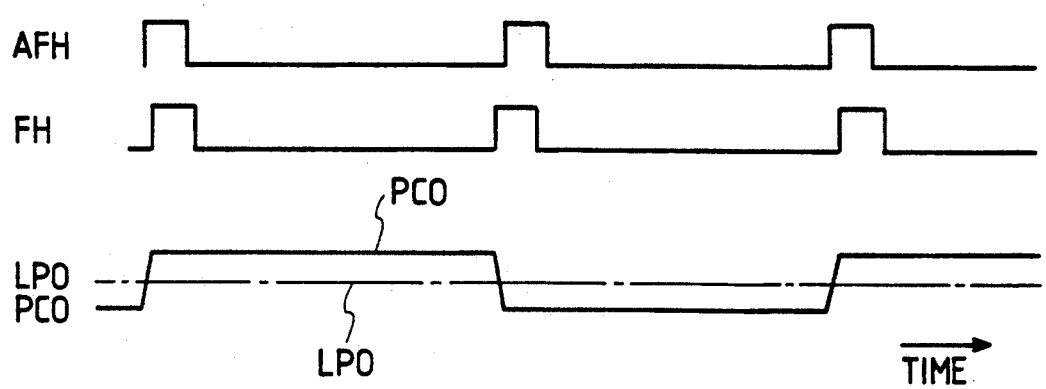
FIG. 5 is a timing diagram showing the waveforms of signals in the frequency converting circuit of FIG. 4.

The phase comparator 21 compares the phase of the pulse signal FH and the phase of the pulse signal AFH which have waveforms such as shown in FIG. 5. When the phase of the pulse signal AFH advances from the phase of the pulse signal FH, the phase comparator 21 outputs a positive voltage PCO as shown in FIG. 5. When the phase of the pulse signal AFH delays from the phase of the pulse signal FH, the phase comparator 21 outputs a negative voltage PCO as shown in FIG. 5.

The output voltage PCO from the phase comparator 21 is smoothed by the low pass filter 22 into a mean level LPO such as shown in FIG. 5. The frequency of the output clock signal 4FSC2 from the voltage-controlled oscillator 23 is varied in accordance with the output voltage LPO from the low pass filter 22. The frequency of the clock signal 4FSC2 is controlled by the PLL circuit 24 so that a mean frequency of the pulse signal FH will be equal to the frequency of the pulse signal AFH.

The servo circuit 11 operates as follows. During the recording process, the servo circuit 11 generates a servo control signal SVR in response to the reference timing signal SVIN fed from the video recording processing circuit 1, and the servo control signal SVR is used in controlling the speed of movement of the magnetic tape 5 relative to the recording head 4. During the reproducing process, the servo circuit 11 generates a servo control signal SVP in response to the reference timing signal SVREF fed from the video reference generating circuit 10, and the servo control signal SVP is used in controlling the speed of movement of the magnetic tape 5 relative to the reproducing head 6.

In the case of a PAL video signal, by referring to the previously-mentioned equation (6), frequencies 4Fsc and fh are related with each other as follows.

$$4fsc = (1135 + 4/625)fh \quad (10)$$

Figure 6:
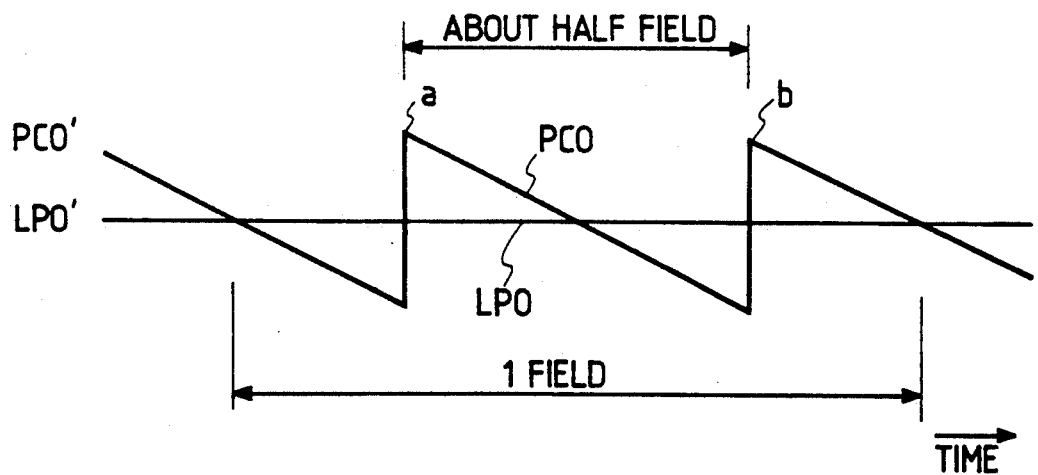
FIG. 6 is a timing diagram showing the waveforms of signals in the frequency converting circuit of FIG. 4.

If pulses of the clock signal 4FSC were directly counted to generate a pulse signal FH with 1135 clock pulses used as a horizontal period, the pulse signal FH would shift at a rate corresponding to 4 clock pulses per 625 horizontal periods, that is, 4 clock pulses per 2 fields (one field corresponds to a vertical period). To prevent such an undesirable shift of the pulse signal FH, a horizontal counter executes an offset process in which 1136 clock pulses are counted and defined as a horizontal period twice for one field. In this case, the output signal PCO' from the phase comparator 21 agrees with a sawtooth phase error voltage as shown in FIG. 6, the parts "a" and "b" of the phase error voltage PCO' correspond to horizontal periods defined by 1136 clock pulses. To prevent an excessive increase in the phase error voltage PCO' which would cause an unstable operation of the PLL circuit 24, horizontal periods defined by 1136 clock pulses are designed so as to occur at approximately equal intervals. Thus, such a slightly-longer horizontal period appears approximately for a half of each field. The time constant and the gain of the low pass filter 22 are preferably chosen so that the output voltage LPO' from the low pass filter 22 hardly varies over a period of one field shown in FIG. 6. This design prevents the frequency of the clock signal 4FSC2 from being too sensitive to the phase error voltage PCO'.

DESCRIPTION OF THE SECOND PREFERRED EMBODIMENT

A second embodiment of this invention is similar to the embodiment of FIGS. 2-6 except for design changes indicated later. The second embodiment is designed for a PAL video signal.

Figure 7:
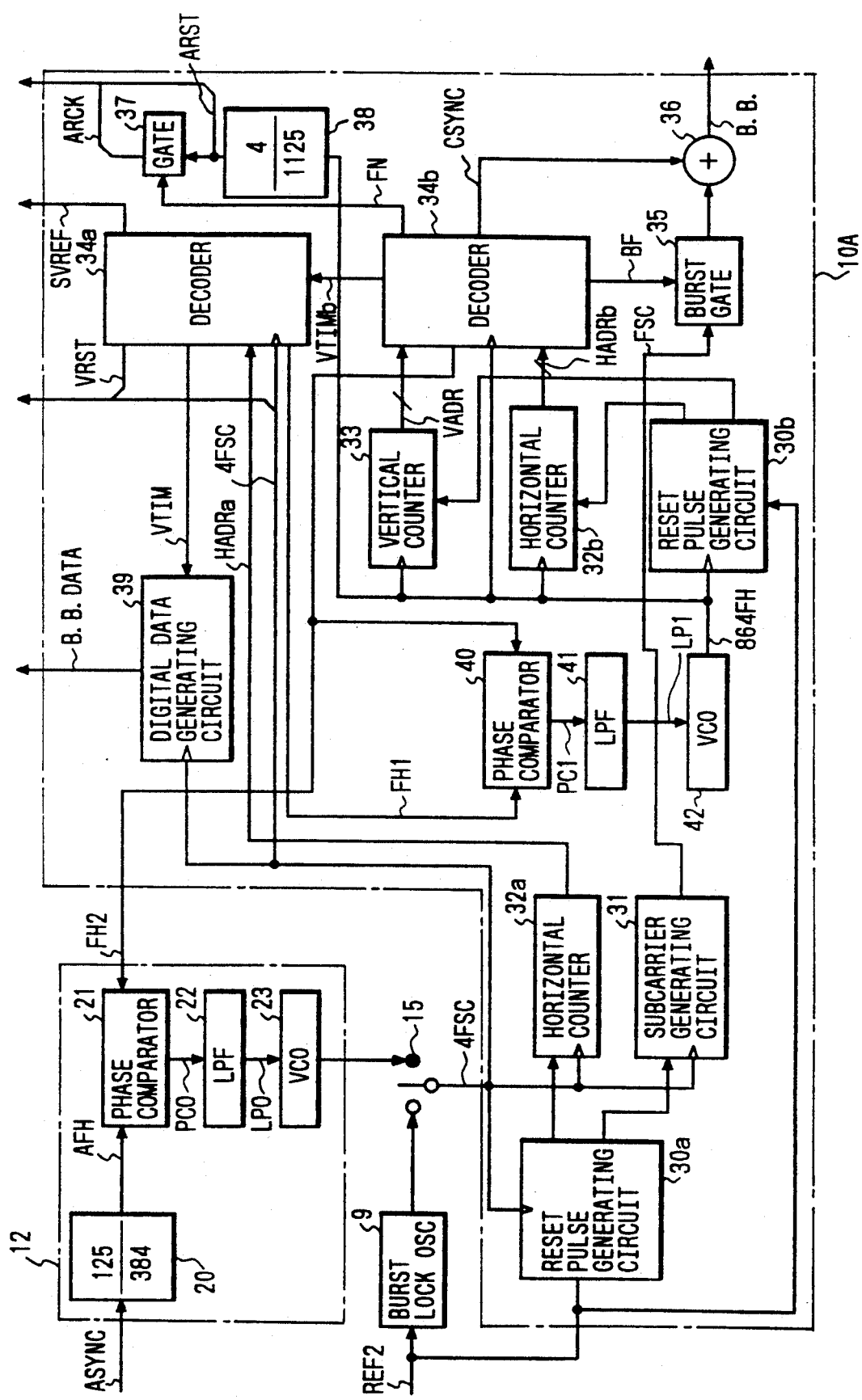
FIG. 7 is a block diagram of a part of a video and audio data recording and reproducing apparatus according to a second embodiment of this invention.

As shown in FIG. 7, a video reference generating circuit 10A in the second embodiment includes a subcarrier generating circuit 31, a vertical counter 33, a burst gate 35, an adder 36, a gate 37, a frequency converter 38, and a digital data generating circuit 39 which are similar to corresponding devices of the video reference generating circuit 10 of FIG. 4. The video reference generating circuit 10A further includes a phase comparator 40, a low pass filter 41, a voltage-controlled oscillator 42, reset pulse generating circuits 30a and 30b, horizontal counters 32a and 32b, and decoders 34a and 34b.

The decoder 34b has a structure approximately similar to the structure of the decoder 34 of FIG. 4. Specifically, the decoder 34b operates in response to a clock signal 864FH, and the structure of the decoder 34b is similar to the decoder 34 of FIG. 13. The decoder 34a operates in response to a clock signal 4FSC, and includes circuits corresponding to the latch circuit 112 and the horizontal address decoder 107 of FIG. 13. The decoder 34a is provided in view of the following facts. The recording and reproducing processes by a digital VTR are responsive to a clock signal 4FSC, and thus it is necessary to synchronize timing signals to respective sections with respect to the clock signal 4FSC. In the case of a PAL video signal, since the phase relation between the clock signal 4FSC and the horizontal period is not constant, it is necessary to provide a horizontal pulse signal (corresponding to the horizontal reset pulse signal HR in FIG. 13) for an offset process based on the video signal processing format of the digital VTR. In addition, since the phase relation between the clock signal 4FSC and the horizontal period is not constant, timing data VTIM fed to a digital data generating circuit includes data which determines the phase relation among the horizontal period, the color subcarrier, and the clock signal 4FSC. For example, by feeding vertical phase information data VADR and a field number signal FN from the decoder 34b via the decoder 34a, the digital data generating circuit 39 is enabled to generate black burst data B.B.DATA having a fixed horizontal period. Such a design is shown, for example, in U.S. application Ser. No. 781,085, or Japanese published unexamined patent application 62-77793, the disclosures of which is hereby incorporated by reference.

The phase comparator 40, the low pass filter 41, and the voltage-controlled oscillator 42 forms a part of a PLL for generating a clock signal 864FH having a frequency equal to 864 times the horizontal frequency fh. The reset pulse generating circuits 30a and 30b serve to determine video reference phases. The reset pulse generating circuit 30a, the horizontal counter 32a, and the decoder 34a operate in response to a clock signal 4FSC. The reset pulse generating circuit 30b, the horizontal counter 32b, and the decoder 34b operate in response to the clock signal 864FH. As shown in FIG. 7, a frequency converting circuit 12 in the second embodiment includes a frequency converter 20, a phase comparator 21, a low pass filter 22, and a voltage-controlled oscillator 23 as the frequency converting circuit 12 of FIG. 4.

Figure 8:
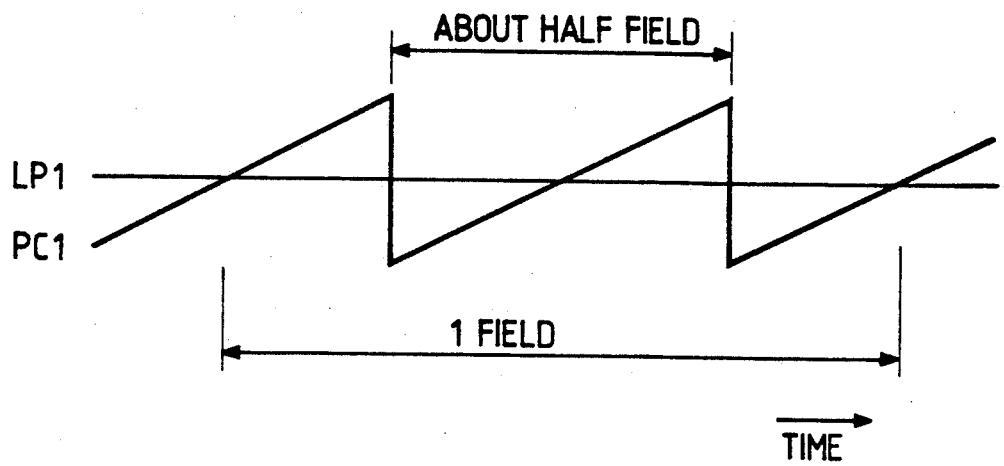
FIG. 8 is a timing diagram showing the waveforms of signals in the apparatus of FIG. 7.

The operation of the reset pulse generating circuit 30a, the horizontal counter 32a, and the decoder 34a is basically similar to the operation of the reset pulse generating circuit 30, the horizontal counter 32, and the decoder 34 of FIG. 4. The decoder 34a generates a horizontal pulse signal FH1 on the basis of horizontal phase information data HADRa fed from the horizontal counter 32a. During the generation of the horizontal pulse signal FH1, an offset process is executed. The decoder 34b outputs a horizontal pulse signal FH2 which is free from an offset process. The phase comparator 40 compares the phases of the horizontal pulse signals FH1 and FH2, and outputs a phase error voltage PC1 in response to the phase comparison. The phase error voltage PC1 has a waveform such as shown in FIG. 8. The polarity of the phase error voltage PC1 of FIG. 8 is opposite to the polarity of the phase error voltage PC0' of FIG. 6. The low pass filter 41 smooths the phase error voltage PC1 into a mean level LP1 such as shown in FIG. 8. The voltage-controlled oscillator 42 is controlled in response to the output voltage LP1 from the low pass filter 41 so that the voltage-controlled oscillator 42 will oscillate at a frequency corresponding to 864 times the horizontal frequency fh. Since a combination of the horizontal counter 32b and the decoder 34b responds to the clock signal 864FH having a frequency which equals to an integer-multiple of the horizontal frequency fh, the horizontal pulse signal FH2 outputted from the decoder 34b is free from an offset process. The horizontal pulse signal FH2 is fed to the phase comparator 21 within the frequency converting circuit 12. In addition, the decoder 34b generates timing data VTIMb, a field number signal FN, a composite sync signal CSYNC, and a burst flag signal BF on the basis of horizontal phase information data HADRb and vertical phase information data VADR fed from the horizontal counter 32b and the vertical counter 33. The timing data VTIMb constitutes a base for generating video signal data. The timing data VTIMb is fed to the decoder 34a. The field number signal FN represents video phase information for matching the audio reproduction phase to the video reproduction phase. The decoder 34a generates timing data VTIM on the basis of the timing data VTIMb and the horizontal phase information data HADRa. The timing data VTIM is fed to the digital data generating circuit 39. In addition, the decoder 34a generates a servo-control timing signal SVREF and a video reproducing reset pulse signal VRST on the basis of the horizontal phase information data HADRa and the timing data VTIMb. The frequency converters 20 and 38 uses predetermined frequency conversion ratios depending on the horizontal frequency fh of a PAL video signal. Specifically, the frequency converter 20 uses a frequency conversion ratio of 125/384. The frequency converter 38 uses a frequency conversion ratio of 4/1125. The frequency converter 38 operates on the clock signal 864FH rather than the horizontal pulse signal FH so that the frequency converter 38 can use a simple frequency conversion ratio.

As described previously, according to this embodiment, since the phase comparator 21 receives the horizontal pulse signal FH2 which is free from an offset process and which is stable in frequency, the gain and the time constant of the low pass filter 22 can be set to suitable values ensuring good response characteristics of the related PLL circuit. The horizontal pulse signal FH2 is also used in the generation of the black burst signal B.B. The frequency converter 38 can use a simple frequency conversion ratio. Since it is unnecessary to execute an offset process in the generation of the horizontal pulse signal FH2, the video reference generating circuit 10A can be realized easily.

DESCRIPTION OF THE THIRD PREFERRED EMBODIMENT

A third embodiment of this invention is similar to the embodiment of FIGS. 2-6 except for design changes indicated later. The third embodiment is designed for a PAL video signal.

Figure 9:
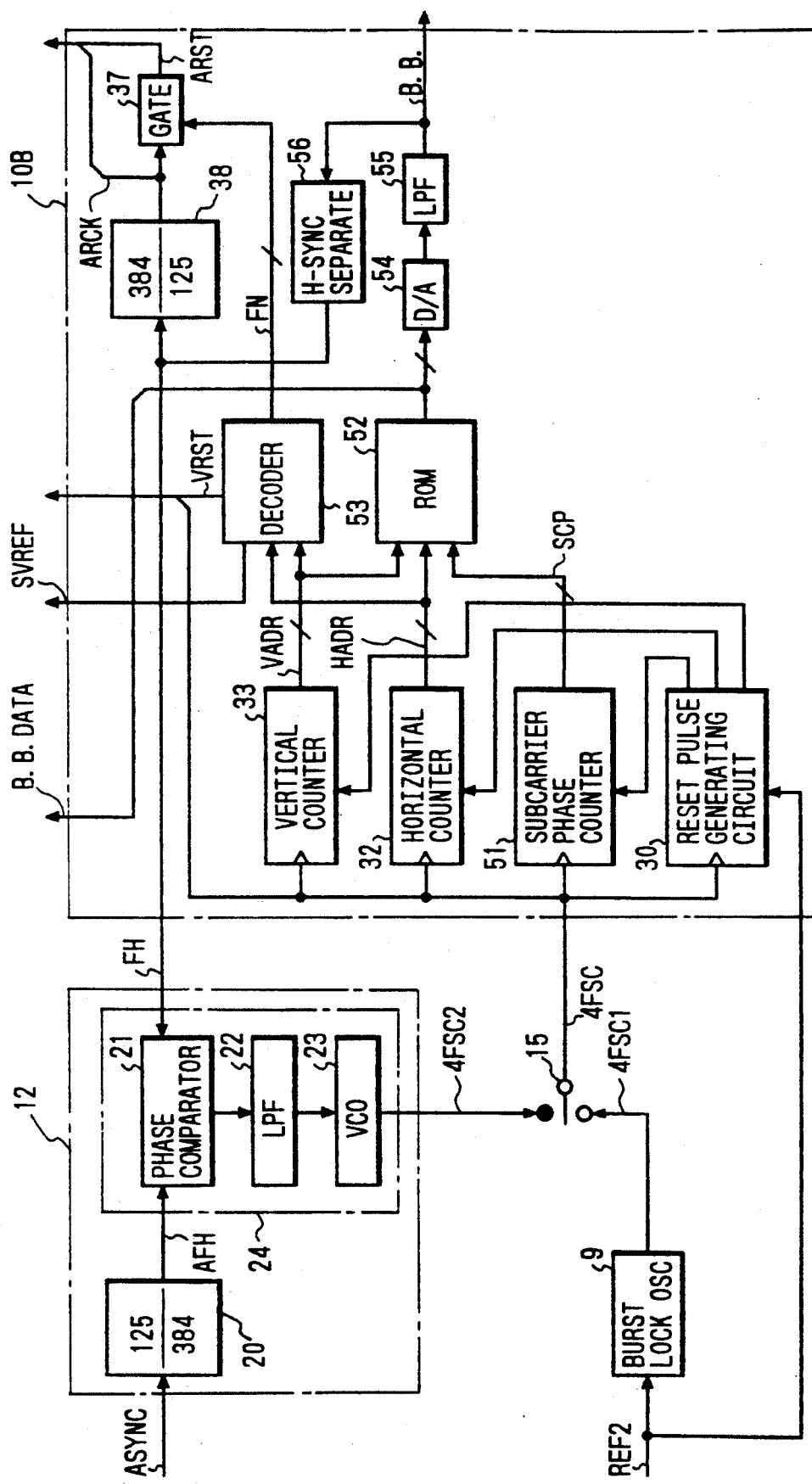
FIG. 9 is a block diagram of a part of a video and audio data recording and reproducing apparatus according to a third embodiment of this invention.

As shown in FIG. 9, a video reference generating circuit 10B in the third embodiment includes a reset pulse generating circuit 30, a horizontal counter 32, and a vertical counter 33 which are similar to corresponding devices of the video reference generating circuit 10 of FIG. 4. The video reference generating circuit 10B further includes a gate 37, a frequency converter 38, a subcarrier phase counter 51, a read only memory (ROM) 52, a decoder 53, a digital-to-analog (D/A) converter 54, a low pass filter 55, and a horizontal sync separating circuit 56. As shown in FIG. 9, a frequency converting circuit 12 in the third embodiment includes a frequency converter 20, a phase comparator 21, a low pass filter 22, and a voltage-controlled oscillator 23 as the frequency converting circuit 12 of FIG. 4. The frequency converter 20 uses a frequency conversion ratio of 125/384.

The decoder 53 includes a combination of the decoders 34a and 34b of FIG. 7, and is designed so as to be operated in response to a clock signal 4FSC. A clock signal 864FH (see FIG. 7) is unnecessary. This is because it is unnecessary to provide a burst flag signal BF and a composite sync signal CSYNC generated from a clock signal of a frequency equal to an integer multiple of the horizontal frequency and required to obtain a black burst signal B.B. Thus, the circuit part of the embodiment of FIG. 7 which operates in response to the clock signal 864FH is omitted from this embodiment, or is designed so as to be used in common by the circuit part operating in response to the clock signal 4FSC. The ROM 52 has a function similar to the function of the digital data generating circuit 39 of FIG. 7.

The subcarrier phase counter 51 counts pulses of a clock signal 4FSC, and is reset by a reset pulse signal fed from the reset pulse generating circuit 30. The subcarrier phase counter 51 generates 2-bit data SCP in response to the clock signal 4FSC and the reset pulse signal, the data SCP representing the phase of the subcarrier. The subcarrier phase counter 51 feeds the subcarrier phase data SCP to the ROM 52 as a part of an address signal. The horizontal counter 32 feeds horizontal phase information data HADR to the ROM 52 and the decoder 53. The vertical counter 33 feeds vertical phase information data VADR to the ROM 52 and the decoder 53. The decoder 53 generates a servo-control timing signal SVREF, a video reproducing reset pulse signal VRST, and a field number signal FN on the basis of the horizontal phase information data HADR and the vertical phase information data VADR. The field number signal FN represents video phase information for matching the audio reproduction phase to the video reproduction phase. The ROM 52 generates video signal data B.B.DATA in response to the carrier phase data SCP, the horizontal phase information data HADR, and the vertical phase information data VADR which compose an address signal. The ROM 52 stores an amount of data which corresponds to one color frame (4 fields in the NTSC television system, and 8 fields in the PAL television system). Digital data corresponding to a black burst waveform are sequentially read out from the ROM 52 in accordance with the address signal composed of the carrier phase data SCP, the horizontal phase information data HADR, and the vertical phase information data VADR.

It should be noted that the ROM 52 may be designed as follows. In both the PAL television system and the NTSC television system, sequences of a horizontal sync signal and a vertical sync signal are completed in two fields. Accordingly, the ROM 52 can be designed so as to store only data representing a 2-field amount of horizontal and vertical sync signals, and data representing an envelope of a burst signal. The burst envelope data is modulated with the subcarrier phase data SCP.

Figure 10:
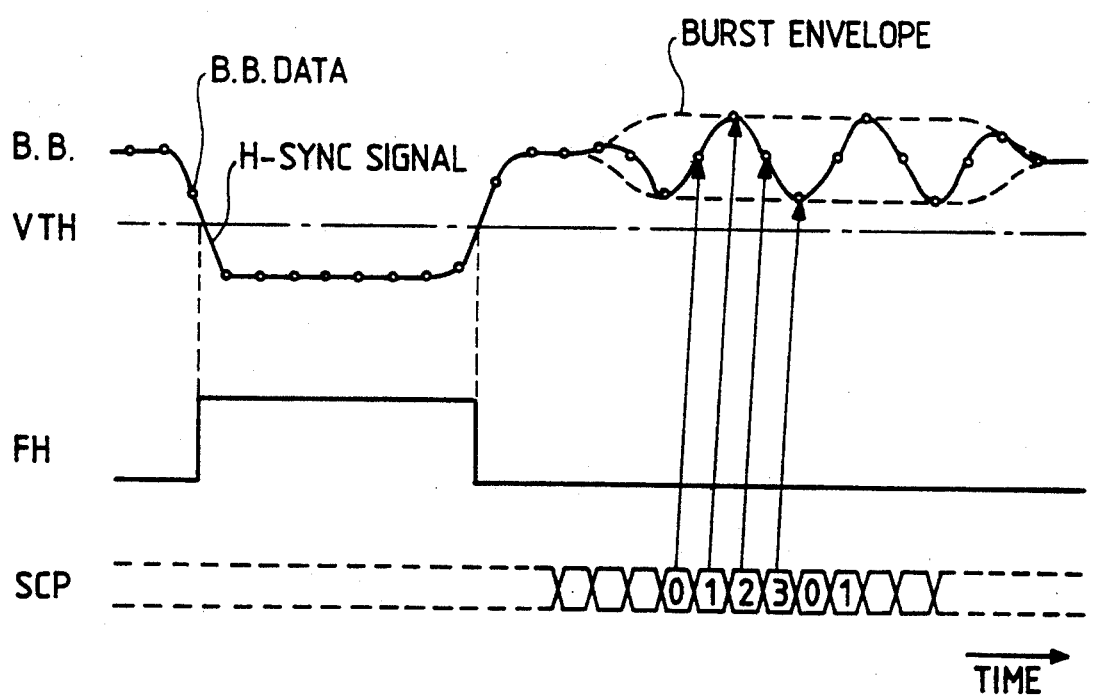
FIG. 10 is a timing diagram showing the waveforms of signals in the apparatus of FIG. 9.

In FIG. 10, the output video data B.B.DATA from the ROM 52 is denoted by sampling-point circles which are positioned at corresponding analog levels for an easy understanding. The video data B.B.DATA has a given timing relation with the subcarrier phase data SCP as shown in FIG. 10.

The D/A converter 54 converts the video data B.B.DATA into a corresponding analog video signal. The low pass filter 55 removes high-frequency components from the output analog video signal of the D/A converter 54, and outputs a black burst signal B.B. which has a waveform such as shown in FIG. 10. The horizontal sync separating circuit 56 separates horizontal sync components from the black burst signal B.B., and thereby outputs a horizontal pulse signal FH. The horizontal pulse signal FH has a given timing relation with the black burst signal B.B. as shown in FIG. 10. For example, the horizontal sync separating circuit 56 includes a comparator which compares the black burst signal B.B. with a threshold VTH (see FIG. 10).

In the PAL television system, the horizontal frequency fh and the sampling clock frequency 4fsc have the offset relation expressed in the previously-mentioned equation (10). Therefore, as shown in FIG. 10, the waveform sampling points of the video data B.B.DATA gradually shift relative to the phase of the horizontal sync signal in each horizontal period. The rate of this shift corresponds to the period of the clock signal 4FSC which is multiplied by 4/625. The video data B.B.DATA is converted by the combination of the D/A converter 54 and the low pass filter 55 into the continuous-waveform black burst signal B.B. which has a constant horizontal period (see FIG. 10). Thus, the horizontal pulse signal FH outputted from the horizontal sync separating circuit 56 is free from an offset process, and has a fixed frequency relation with the clock signal 4FSC.

The frequency converter 38 converts the horizontal pulse signal FH into a digital-audio reproduced clock signal ARCK. The frequency converter 38 uses a frequency conversion ratio of 384/125. The gate 37 gates the clock signal ARCK in response to the field number signal FN, generating the reset pulse signal ARST from the clock signal ARCK. The reset pulse signal ARST determines the digital audio reproduction phase.

For the NTSC television system, this embodiment is modified as follows. The frequency converter 20 uses a frequency conversion ratio of 375/1144. The frequency converter 38 uses a frequency conversion ratio of 1144/375. The data in the ROM 52 is modified so as to match the NTSC television system.

What is claimed is:

1. In a system wherein a video recording processing circuit and an audio recording processing circuit process digital recording video data and digital recording audio data; output data from the video recording processing circuit and the audio recording processing circuit is recorded into a recording medium by using a sync signal of the digital recording video data as a reference; a video reproducing processing circuit and an audio reproducing processing circuit process data reproduced from the recording medium; and reproduced video data and reproduced audio data are outputted in synchronism with an externally generated reference video signal inputted to the system, video and audio data recording a reproducing apparatus usable in combination with a digital audio interface, comprising:
a frequency converting circuit for generating a clock signal of a video sampling frequency from one of a clock signal or a sync signal outputted from the digital audio interface;
an oscillator for generating a clock signal of the video sampling frequency;
a video reference generating circuit for generating a video timing signal, an audio timing signal, and black burst data from one of the clock signals generated by the frequency converting circuit and the oscillator and from the external reference video signal;
said video reference generating circuit including reference-detecting means for detecting the external reference video signal;
first switching means for, in cases where the recording audio data is recorded or edited, replacing the recording video data by the black burst data and feeding the black burst data to the video recording processing circuit;
second switching means for, in cases where the recording audio data is recorded or edited, replacing the video-sampling-frequency clock signal from the oscillator by the video-sampling-frequency clock signal from the frequency converting circuit and feeding the video-sampling-frequency clock signal from the frequency converting circuit to the video reference generating circuit; and
third switching means for, in cases where the recording audio data is recorded or edited, suspending detection of the external reference video signal by said reference detecting means in the video signal by said reference detecting means in the video reference generating circuit, and inhibiting a timing reset of the video reference generating circuit.

2. The video and audio data recording and reproducing apparatus of claim 1 wherein the oscillator comprises means for generating the video-sampling-frequency clock signal from burst components of the external reference video signal, the video sampling frequency being equal to four times a color subcarrier frequency, wherein the frequency converting circuit comprises a frequency converter for executing a frequency conversion process on the clock signal or the sync signal outputted from the digital audio interface, and converting the clock signal or the sync signal into a horizontal-frequency signal, a PLL circuit including a phase comparator for comparing a phase of the horizontal-frequency signal outputted from the frequency converter and a phase of a horizontal-frequency signal outputted from the video reference generating circuit, said PLL circuit outputting a clock signal having a frequency which is controlled in response to a result of the comparison between the phase of the horizontal-frequency signal outputted from the frequency converter and the phase of the horizontal-frequency signal outputted from the video reference generating circuit, and wherein the video reference generating circuit comprises means for frequency-dividing the video-sampling-frequency signal and converting the video-sampling-frequency signal into the horizontal-frequency signal, means for feeding the horizontal-frequency signal to the frequency converting circuit.

3. The video and audio data recording and reproducing apparatus of claim 1 wherein the oscillator comprises means for generating the video-sampling-frequency clock signal from burst components of the external reference video signal, the video sampling frequency being equal to four times a color subcarrier frequency in a PAL television system, wherein the frequency converting circuit comprises a frequency converter for executing a frequency conversion process on the clock signal or the sync signal outputted from the digital audio interface, and converting the clock signal or the sync signal into a horizontal-frequency signal having a frequency corresponding to a predetermined horizontal-frequency of a video signal, a first PLL circuit including a phase comparator for comparing a phase of the horizontal-frequency signal outputted from the frequency converter and a phase of a horizontal-frequency signal outputted from the video reference generating circuit, said first PLL circuit outputting a clock signal having a frequency which is controlled in response to a result of a comparison between the phase of the horizontal-frequency signal outputted from the frequency converter and the phase of the horizontal-frequency signal outputted from the video reference generating circuit, and wherein the video reference generating circuit comprises a first horizontal counter for frequency-dividing the video-sampling-frequency signal and generating a first horizontal-frequency pulse signal having a phase approximately equal to a phase of a horizontal sync signal, a second PLL circuit for generating a clock signal of a frequency equal to an integer multiple of the horizontal-frequency on the basis of the first horizontal-frequency pulse signal, and a second horizontal counter for generating a second horizontal-frequency pulse signal from the clock signal generated by the second PLL circuit, and feeding the second horizontal-frequency pulse signal to the frequency converting circuit.

4. The video and audio data recording and reproducing apparatus to claim 1 wherein the oscillator comprises means for generating the video-sampling-frequency clock signal from burst components of the external reference video signal, the video-sampling-frequency being equal to four times a color subcarrier frequency, wherein the frequency converting circuit comprises a frequency converter for executing a frequency conversion process on the clock signal or the sync signal outputted from the digital audio interface, and converting the clock signal or the sync signal into a horizontal-frequency signal, a PLL circuit including a phase comparator for comparing a phase of the horizontal-frequency signal outputted from the frequency converter and a phase of a horizontal-frequency signal outputted from the video reference generating circuit, said PLL circuit outputting a clock signal having a frequency which is controlled in response to a result of a comparison between the phase of the horizontal-frequency signal outputted from the frequency converter and the phase of the horizontal-frequency signal outputted from the video reference generating circuit, and wherein the video reference generating circuit comprises a counter for frequency-dividing the video-sampling-frequency signal and counting a color subcarrier phase and horizontal and vertical phases, a ROM receiving an output signal from the counter as an address signal and outputting digital data of a black burst signal, a digital-to-analog converter for converting the digital data of the black burst signal into a corresponding analog black burst signal, a low pass filter for removing high-frequency components from the analog black burst signal, and a horizontal sync separating circuit for generating the horizontal-frequency signal fed to the frequency converting circuit on the basis of an output signal from the low pass filter.

5. A video and audio data recording apparatus comprising a video recording processing circuit for processing first video recording data into second video recording data, and generating a timing control signal on the basis of the first video recording data; a digital audio interface; an audio recording processing circuit for processing first audio recording data into second audio recording data; means for recording the second video recording data and the second audio recording data into a recording medium; and servo-control means for controlling the recording means in response to the timing signal; the improvement comprising:
 means for feeding output data from the digital audio interface to the audio recording processing circuit as the first audio recording data;
 means for determining a fixed-frequency timing component of the output data from the digital audio interface;
 means for generating a reference clock signal on the basis of the fixed-frequency timing component of the output data from the digital audio interface, the reference clock signal having a fixed frequency relation with the fixed-frequency timing component of the output data from the digital audio interface;
 means for generating reference data on the basis of the reference clock signal, the reference data corresponding to a black burst signal; and
 means for feeding the reference data to the video recording processing circuit as the first video recording data.

6. The video and audio recording apparatus of claim 5 wherein the reference clock signal has a frequency equal to a predetermined frequency of a sampling clock signal related to the first video recording data.

7. A video and audio data recording apparatus usable in combination with digital audio interface, comprising:
 means for recording video data and audio data into a recording medium;
 means for generating a first timing signal on the basis of the video data;
 means for extracting audio data from an output signal of the digital audio interface, and feeding the extracted audio data to the recording means;
 means for detecting presence and absence of the video data;
 means for generating a second timing signal on the basis of the output signal of the digital audio interface in the absence of the video data; and
 servo-control means for controlling the recording means in response to the first timing signal in the presence of the video data and in response to the second timing signal in the absence of the video data.

8. The video and audio data recording apparatus of claim 7 wherein the second-timing-signal generating means comprises means for generating the second timing signal on the basis of a fixed-frequency component of the output signal of the digital audio interface, the second timing signal having a fixed frequency relation with the fixed-frequency component of the output signal of the digital audio interface.

* * * * *